(12) United States Patent
Montreuil

(10) Patent No.: US 6,690,565 B2
(45) Date of Patent: Feb. 10, 2004

(54) METHOD AND APPARATUS FOR NEUTRALIZING STRAY CURRENT IMPULSES

(75) Inventor: Michel Montreuil, 13, rue Marie-Claude, St-Charles-de-Bellechasse, Québec (CA), G0R 2T0

(73) Assignee: Michel Montreuil, St-Charles-de-Bellechasse (CA)

( * ) Notice: Subject to any disclaimer, the term of this patent is extended or adjusted under 35 U.S.C. 154(b) by 113 days.

(21) Appl. No.: 10/118,016

(22) Filed: Apr. 9, 2002

(65) Prior Publication Data

US 2003/0189432 A1 Oct. 9, 2003

(51) Int. Cl.$^7$ ............... H01T 23/00; H02H 1/00; H02H 9/08; H02H 3/22
(52) U.S. Cl. ............... 361/232; 361/220; 361/212; 361/42; 361/43; 307/327; 307/326
(58) Field of Search ............... 361/42, 43, 58, 361/232, 220, 212; 307/327, 326, 147, 5

(56) References Cited

U.S. PATENT DOCUMENTS

| | | | | |
|---|---|---|---|---|
| 5,321,318 A | * | 6/1994 | Montreuil | ............ 307/326 |
| 5,671,110 A | * | 9/1997 | McCartney et al. | ............ 361/42 |
| 5,914,842 A | * | 6/1999 | Sievers | ............ 361/42 |

* cited by examiner

Primary Examiner—N. Le
Assistant Examiner—Donald M Lair
(74) Attorney, Agent, or Firm—Ogilvy Renault

(57) ABSTRACT

The attenuation of the stray current impulse limits the capacitive leakage. The value of the inductance, coupled to the parasitic capacitance of the charge, creates a reactive filter effect. Since the effect is reactive, the impulse energy is not absorbed. The energy is therefore redistributed in time, but since the intensity of the tension is greatly diminished, the coupling through the capacitances is diminished. The apparatus comprises a core which includes 1, 2, 3 or 4 coils. The apparatus is typically a high quality reactance which includes a low reactive value in opposition of the line current (residual mode) and a high reactive value for the circulation of the parallel current (common mode).

13 Claims, 16 Drawing Sheets

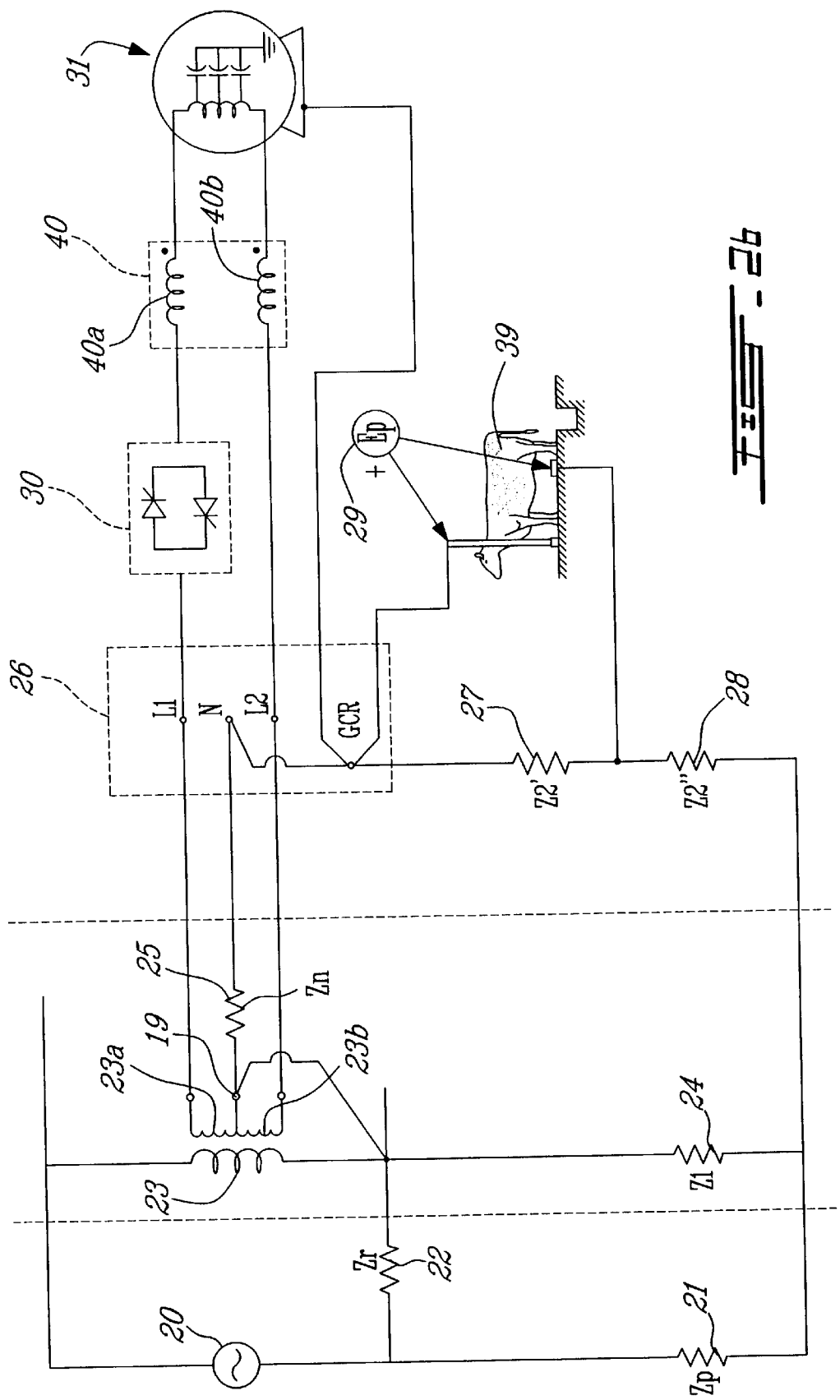

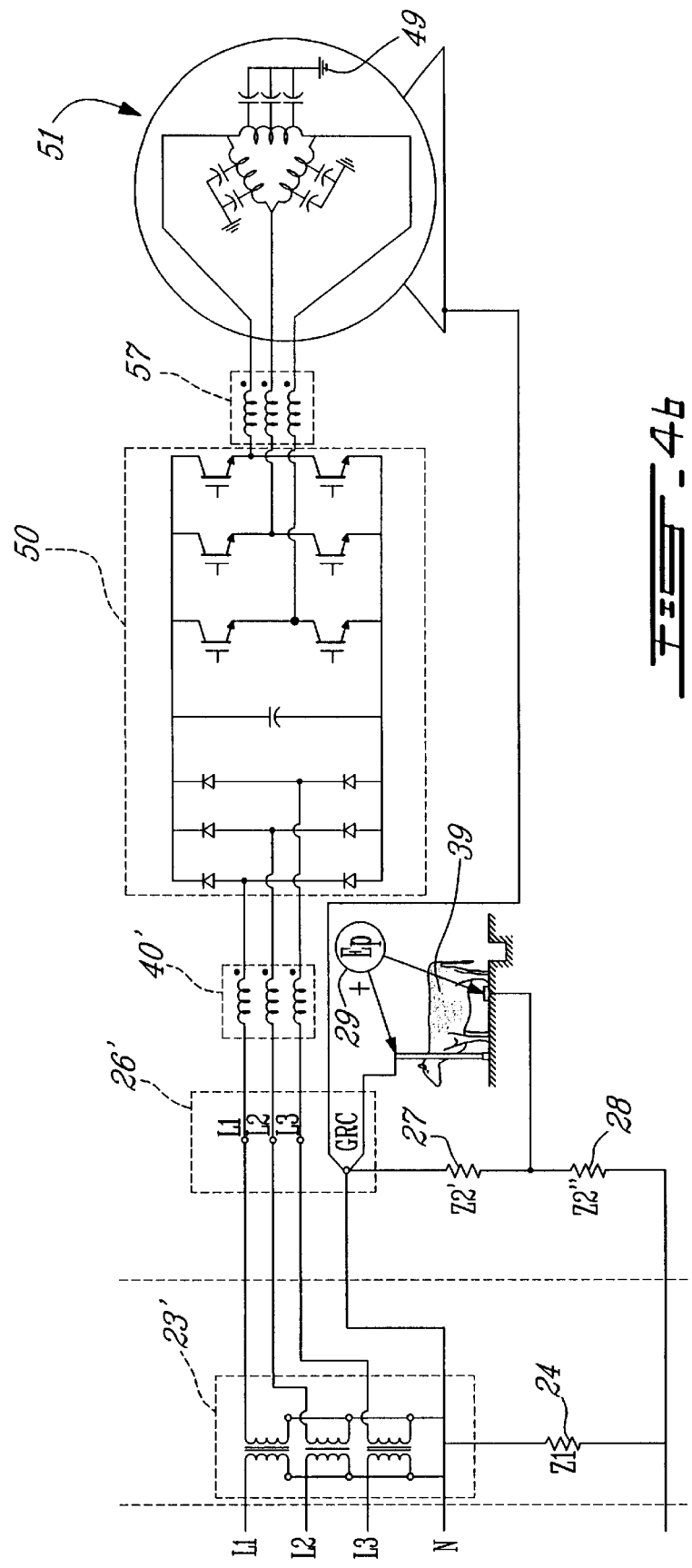

METHOD AND APPARATUS FOR NEUTRALIZING STRAY CURRENT IMPULSES

CROSS-REFERENCE TO RELATED APPLICATIONS

The application is the first-filed application for this invention.

FIELD OF THE INVENTION

The invention relates to a method and an apparatus for attenuating stray current flowing through ground return circuits in the vicinity of an animal susceptible to be affected by the current.

BACKGROUND OF THE INVENTION

When a stray current impulse from the concrete floor of a livestock barn flows through the body of an animal to reach the metallic structures of that building and its grounding connection network, the animal is affected by this stray current impulse. This usually causes a physiological reaction of the animal resulting into abnormal health conditions.

For example, the physiological reaction of a human being when an electric current pulse flows through his body (hand-trunk-foot) can be summarized as follows: slight perception threshold: 1 to 8 mA rms; painful sensation threshold: 9 to 80 mA rms; dangerous threshold: greater than 81 mA rms, for a duration of 1 second.

Stray current will cause symptoms specific to each species. For example, cows will refuse to be milked and to enter the barn and may kick the milker. In the most critical situations, the cows will present problems of mastitis, of reproduction, of somatic cell count, etc.

Pigs can present similar symptoms: cases of cannibalism and mastitis, and problems of diarrhea, of temperature and of constipation may be found. In the most critical cases, the death rate of the piglets may considerably increase.

A stray voltage is a potential difference existing between two points susceptible to be contacted simultaneously by an animal to cause a flow of current through the animal's body. A stray voltage can also be defined as a potential difference between two points caused by a flow of current through the body of an animal.

A stray voltage can produce a flow of current both through the body of the animal from the concrete floor of the livestock barn toward metallic structures of that livestock barn contacted by the animal (touch voltage circuit), and through the animal's body from one paw to the other (step voltage circuit).

For a same path through a body, the danger for the animal depends essentially on the intensity and the duration of the travel of the current. The most serious criteria is the admissible value of the contact voltage, that is the product of the current passing through the body and its impedance, as a function of time. The relationship between the current and the voltage is not linear since the impedance of the body depends on the frequency of the signal.

Different portions of the body, such as the skin, the blood, the muscles and other tissues and articulations, have a certain resistive and capacitive impedance.

The internal body impedance ($Z_i$) can be considered to be mainly resistive. However, studies demonstrate that a low capacitive element is also present.

The skin impedance ($Z_p$) can be considered to comprise a set of resistive and capacitive elements. Its structure is composed of a semi-conducting layer and small conducting elements (the pores). The skin impedance decreases rapidly as the current increases.

The value of the skin impedance varies depending on the voltage, the frequency, the duration of the passage of the current, the surface of contact, the pressure of the contact, the humidity factor of the skin and the temperature.

The total body impedance ($Z_t$) is composed of a resistive and a capacitive element.

Since the skin impedance varies according to the frequency, the total body impedance is greater with a DC current and decreases as the frequency increases.

The skin impedance decreases as the frequency increases.

At the moment when the contact voltage is applied, the body capacitive elements are not charged, that is why the skin impedances $Z_p$ are negligible and the initial body resistance ($R_i$) is approximately equal to the internal body impedance $Z_i$. The resistance $R_i$ limits the short current peaks.

The industry has employed several different hardware solutions to reduce overvoltages. According to a simple reactor solution, three inductors are provided, a separate one of the inductors placed in series with each of the three supply lines between an Variable Speed Drive (VSD) and the three motor terminals.

According to another solution, a sine wave filter is linked to the supply lines wherein this filter includes three capacitors and three inductors. A separate inductor is positioned in series with each supply line. One capacitor is linked between each pair of supply lines.

According to yet another solution, a dv/dt filter is linked to the three supply lines between an VSD and a motor. The filter includes three inductors, three resistors and three capacitors. Again, a separate inductor is positioned in series with each supply line. A separate resistor is linked in series with a separate capacitor between each pair of supply lines.

According to one other solution, a resistor-inductor-diode (RLD) filter is linked to the supply lines. The RLD filter includes six diodes, three inductors and two resistors. A separate inductor is positioned in series with each supply line. The diodes are arranged in series pairs to form three parallel diode legs between positive and negative terminals. A node between the diodes of each leg is linked to a separate supply line and the positive and negative terminals are connected through separate resistors to positive and negative DC drive buses, respectively.

While each of the overvoltage solutions identified above effectively reduces overvoltages, each solution suffers from at least one and typically a plurality of the following shortcomings. Some of the shortcomings of these prior art systems are: they are configured using relatively large components and therefore require large volumes, they require a large number of components and therefore are relatively expensive to configure, they provide only poor/slow dynamic response to a motor load, they create periodic instability, they cause line-to-line neutral voltage to be undamped, they cause resonant conditions in line-to-neutral voltage, they cause rise times which vary as a function of cable length, and/or they can only be used with specific cable lengths.

SUMMARY OF THE INVENTION

An object of the present invention is therefore to provide a method and system for efficiently neutralizing stray voltage and current impulses that can flow through an animal's body which is kept in a building having a metallic structure.

Another object of the invention is to provide a method and system for attenuating stray voltage and current impulses in a ground return circuit, by adding an inductive component which, when coupled to the parasitic capacitance of the charge, creates a reactive filter effect.

According to a first broad aspect of the present invention, there is provided a method for attenuating a stray current impulse flowing through a ground return circuit in a proximity of an animal susceptible to be affected by the stray current impulse. The method comprises providing an impedance having one coil for each power line at an input of an electrically conductive element; connecting the impedance in series between the output of a power source and the electrically conductive element, the electrically conductive element being connected to the ground return circuit; whereby attenuation of the stray current impulse limits capacitive leakage which affects the animal and whereby an inductance of the impedance, coupled to a parasitic capacitance of the electrically conductive element, creates a reactive filter effect.

Preferably, the coils are magnetically coupled via a common ferrite core. Preferably, the coils have a same number of windings. Preferably, a summation of ampere turns of the coils is equal to zero;

More specifically, in accordance with the present invention, there is provided a method for neutralizing a stray voltage produced in a ground return circuit and a stray current flowing through the ground return circuit in the proximity of an animal susceptible to be affected by the stray voltage and current impulses.

In this method for neutralizing a stray current impulse, there are two preferred embodiments: in the capacitive mode (motor), the subtransmission of the voltage (dv/dt) can be modified in the winding of the motor to decrease the frequency; in the resistive mode, a series impedance can be inserted in the circuitry (fencer).

The method for attenuating the stray current impulse limits the capacitive leakage by modifying the response in frequency and attenuates the current value and the circulation of the impulse on the ground return network (Z2).

The method for attenuating the stray current impulse comprises introducing an inductance value which, when coupled to the charge parasitic capacitance, creates a reactive filter effect. Since the effect is of the reactive type, the impulse energy is not absorbed. However, this solution allows to start with a situation wherein short and intense impulses are transformed into a permanent regime at low amplitude.

The apparatus comprises a core in which are included 1, 2, 3 or 4 coils. The apparatus is typically a high quality reactance which includes a low reactive value with respect to the line current (residual mode) and a high reactive value with respect to the parallel current (common mode).

BRIEF DESCRIPTION OF THE DRAWINGS

These and other features, aspects and advantages of the present invention will become better understood with regard to the following description and accompanying drawings wherein:

FIG. 2b illustrates an alternative location for the SVF (Stray Voltage Free) filter to that of FIG. 2a;

FIG. 4b illustrates an equivalent circuit for a three-phased system with variable speed in which the stray current is attenuated, having a three-phase supply;

FIG. 6 illustrates the equivalent electrical circuit for an electrified controller in which the stray current is attenuated;

FIG. 12 illustrates the impedance versus the frequency for the SVF filter.

DETAILED DESCRIPTION OF THE PREFERRED EMBODIMENT

Figure 1A:
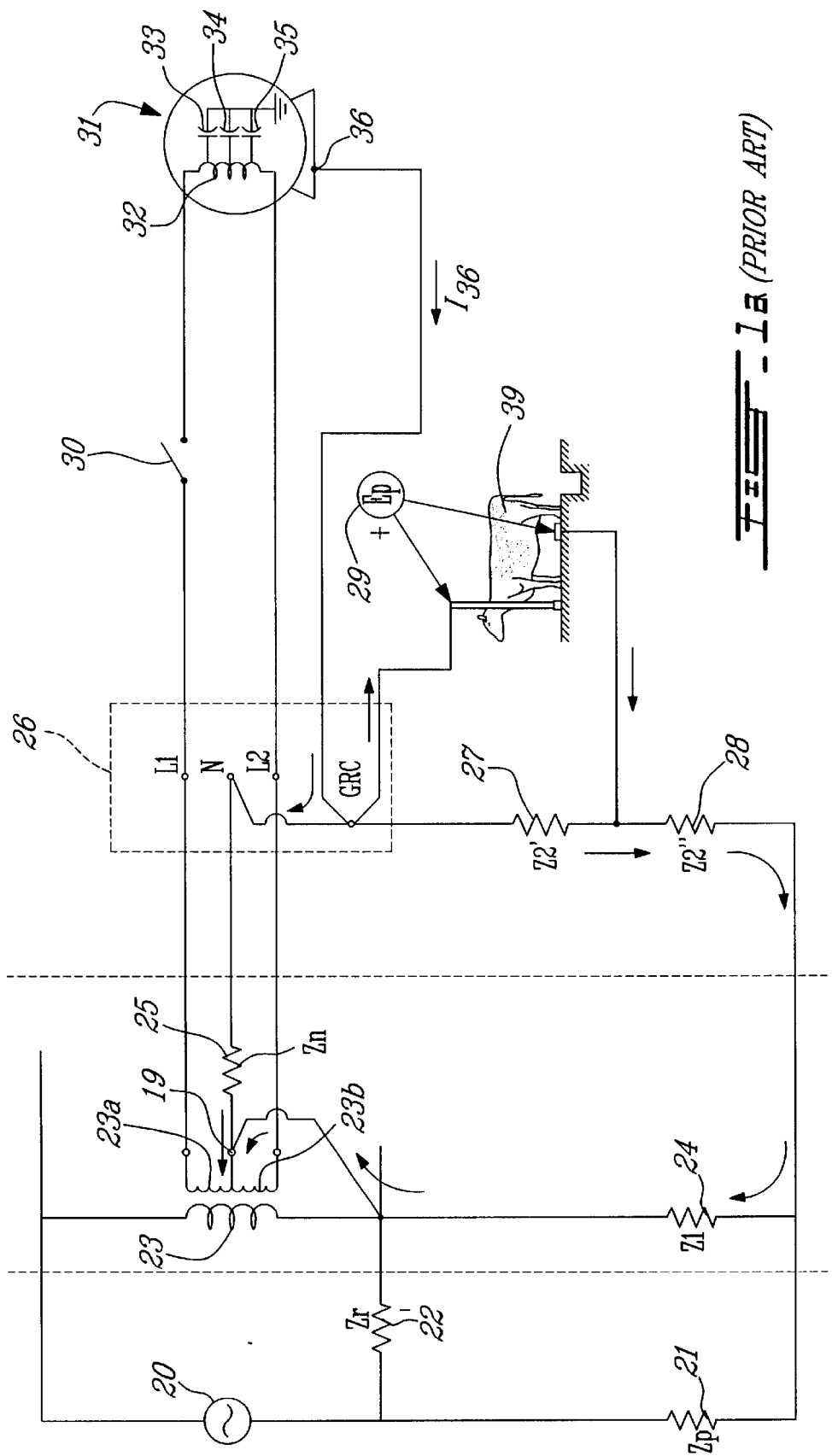
FIG. 1a illustrates a prior art circuit in the case of a variable speed control of a single-phase motor with a phase controller drive (Silicon Control Rectifier—SCR) and a single-phase supply.

In the different figures of the appended drawings, the corresponding elements are identified by the same reference numerals.

A body has a resistive and a capacitive value. Since these values are on a parallel circuit, the total impedance is a function of the frequency.

The equivalent electrical model for a cow consists of a resistance of 200 ohms and a capacitance of 50 nF in parallel.

Using the equivalent electrical model for a cow, it is possible to calculate a maximum level of noise tolerable by the cow corresponding to 8 mA rms.

The capacitive body impedance (capacitive reactance) is calculated at the frequencies in question:

$$Xc = 1/2\pi * f * C$$

Xc=212.31 ohms at 15 kHz

Then, the total impedance is determined (capacitive and resistive charges in parallel):

$$Zt = Zc*Zr/(Zc^2+Zr^2)^{1/2}$$

Zt=145.58 ohms at 15 kHz

The insertion of a mitigation to attenuate the impulse currents is aimed at decreasing the value of the frequency and to amortize the energy on a plurality of periods. The energy cannot be eliminated, it can be distributed on a great number of periods. This decreases the peak value of the first impulse.

TABLE 1

Maximum currents as a function of the impedance Z2

| Frequency | Zt cows (ohms) | Izt (rms) | Ezt (rms) | IZ2 (Z2 = 1 ohm) | IZ2 (Z2 = 3 ohms) |
|---|---|---|---|---|---|
| 1 kHz | 199.61 | 0.008 | 1.597 V | 1.597 A | 0.532 A |
| 15 kHz | 145.58 | 0.008 | 1.164 V | 1.164 A | 0.388 A |
| 50 kHz | 60.69 | 0.008 | 0.485 V | 0.485 A | 0.161 A |
| 100 kHz | 31.45 | 0.008 | 0.251 V | 0.251 A | 0.083 A |

For frequencies above 100 kHz the tingling sensation which is characteristic of the perception at lower frequencies changes into a sensation of warmth.

A cow has a total impedance (Zt) at 60 Hz of 200 ohms. According to the literature, a body has a low impedance value. For the cow, the literature specifies 50 nF. Table 1 presents the total impedance at a given frequency as well as the maximum voltage at Z2 to maintain the current within the slight perception range. Assuming that Z2 is equivalent to 1 ohm, the maximum capacitive stray current can be deducted (IZ2 at 1 ohm). The impedance Z2 is highly important in the evaluation of the acceptable residual current.

The stray current circulating in the ground return circuits can then be attenuated: in the capacitive mode (IGBT) effacer, by including a low reactance value for the circulation of the current in inverted phase (residual mode); in the galvanic mode (fencer) effacer, by including a high reactance value for the circulation of the parallel current (common mode).

The attenuation of the impulse current using a reactance placed in an electrical circuit has the following characteristics: in the capacitive mode IGBT, the stray voltage and current can be attenuated by placing a reactance in series with the electrical charge (common mode choke); in the galvanic mode fencer, the stray impulse voltage and current can be attenuated by placing a reactance in the ground return network (common mode choke) having an impedance and frequency adapted to the stray current. This is a low cost way of attenuating the stray voltage and it is in accordance with national electrical codes. The insertion of an adapted reactance into the electrical circuit or in series with the ground return circuit attenuates the stray voltage generated by the circulation of the stray current. The value of the stray current on the ground return circuit is lowered to values sufficiently low that the animal comfort zone is reached, that is the value of the stray current is below 8 mA rms.

Variable Speed Drive installation, commonly used in farming, generates stray current impulse in the farm ground return system and stray voltage in the livestock environment.

Figure 3A:
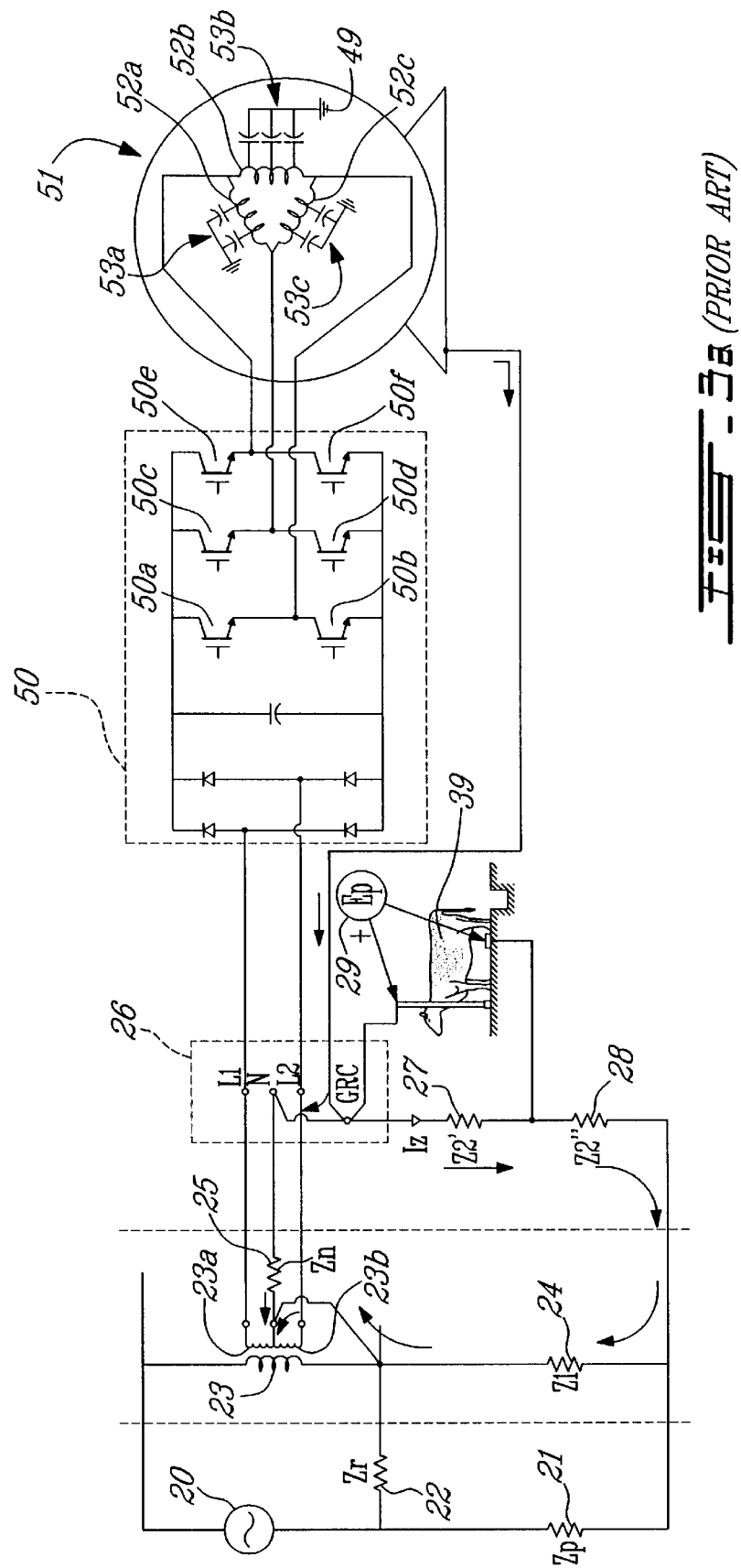
FIG. 3a illustrates a prior art circuit in the case of a variable speed control of a three-phase motor with a PWM (pulse width modulation) controller type, having a single-phase supply.

There are two types of variable speed drives available in farms: one involving SCR (Silicon Controlled Rectifiers) and commonly called phase controller (see FIG. 1b), one involving Insulated Gate Bipolar Transistor (IGBT) and commonly called PWM (Pulse Width Modulation) controller (see FIG. 3a).

For both controllers, the stray current circulating in the ground return system of the farm is related to the capacitance component of the driven motor winding and related circuit.

Figure 1B:
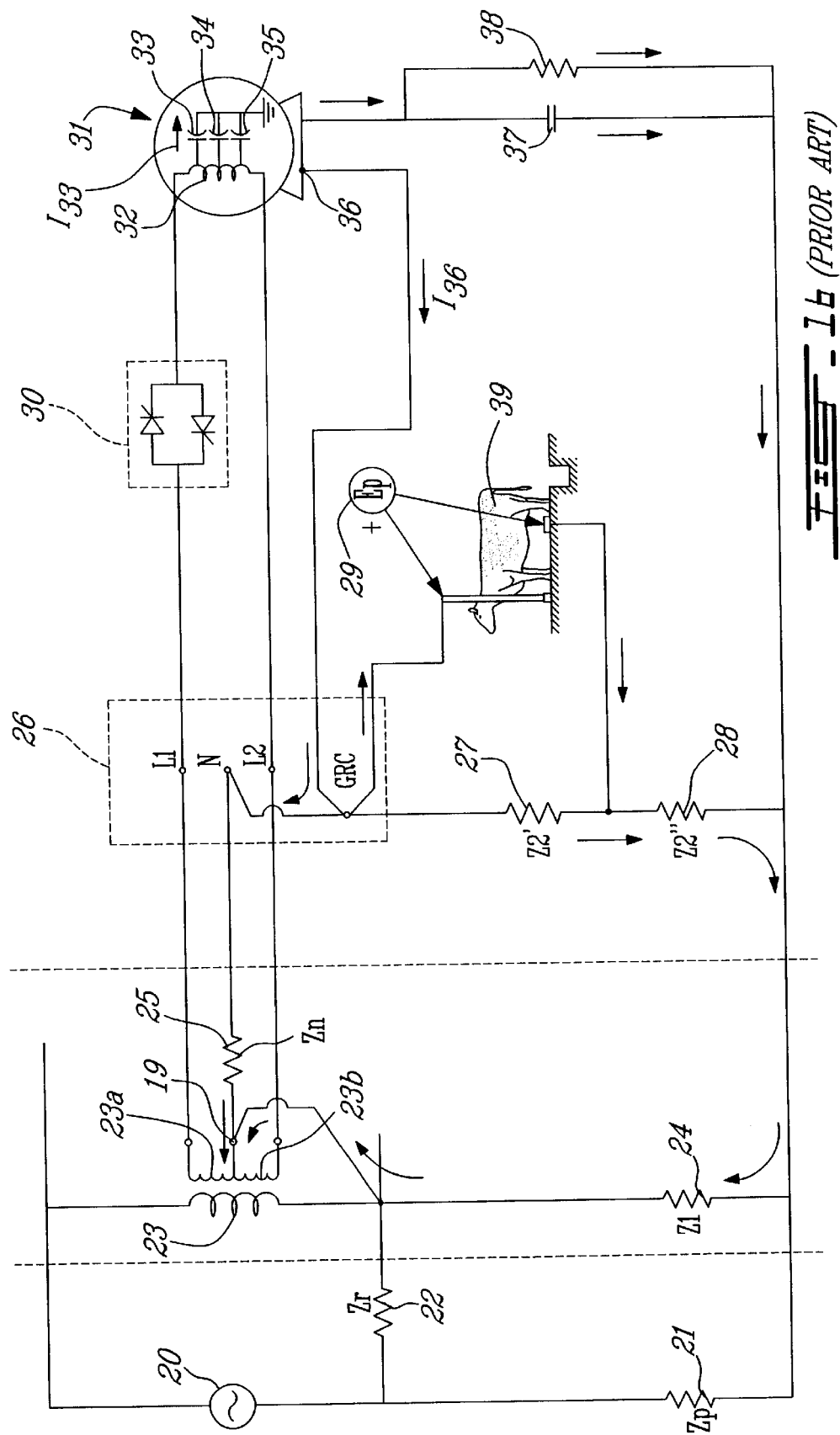
FIG. 1b illustrates a prior art equivalent circuit for a monophased system with variable speed in which the motor is not connected to the safety connection.

For simplicity, refer to FIGS. 1a and 1b, in the case of a prior art variable speed control of a single-phase motor with a phase controller drive (SCR).

The motor winding 32 is isolated from the ground 36. The motor winding 32 and the motor core 31 are grounded by the power supply circuit's safety ground conductor 36. The motor winding 32 and the motor core 31 comprise capacitors 33, 34, 35. This capacitance 33, 34, 35 is distributed over the whole of the motor's stator winding 31 and the supply cabling.

When the electronic switch 30 of the phase controller is opened, all the winding 32 of the motor 31 is subjected to the L2 voltage and the capacitance 33, 34, 35 of the winding 32 is charged at voltage E2 with respect to the ground 36.

When the switch 30 is closed, voltage E1 is applied at the other end of the winding 32, the profile of the voltage along the winding 32 is suddenly readjusted by the new voltage profile. This results in the circulation of the current I36 between the core 31 of the motor and the center tap 19 of the utility transformer via the ground return conductor 36 that is connected to the motor frame. Part of this current I36 will travel through the farm's ground return electrode 27 to the center tap 19 of the transformer via the earth and the utility ground return networks 24.

The stray voltage in the livestock environment is equivalent to Ep=I2 Z2, where I2 is the part of the capacitive current or stray current that will circulate in the ground return electrode of the farm.

The equivalent electric circuit for the circulation of the capacitive current at the moment when the SCR turn on, is a RLC circuit where the inductance L corresponds to the leakage reactance of the utility transformer and the reactance of the motor winding. The capacitance component corresponds to the ground capacitance of the motor stator winding.

When the switch is closed, the charges will be redistributed in the capacitor. Because of the inductive element, the redistribution of the charges will be alternative.

The resonance frequency of the circuit corresponds to:

$$f = \frac{1}{2\pi\sqrt{LC}}$$

The current at the redistribution of the charges will be at its highest when the voltage E is at its highest, that is, when the switch is closed while the voltage is at its 90° angular position.

The maximum current during the re-distribution of the charges is calculated to be:

$$I\max = 2E\sqrt{\frac{C}{L}}$$

The SCR device turns on and off 120 times per second (twice per cycle). Each time the SCR device turns on, a stray current discharge is circulated in the motor winding capacitance and the farm ground return system Z2. The typical current frequency is 70 kHz and the burst is typically 2 or 3 cycles long.

Even if the frame of the motor is not connected to the ground, there is still a capacitance between the winding and the core, and consequently within the motor frame 31. In turn, the frame has a capacitance 37 with the earth, the building and its environment. This capacitance 37 is also supported by a leakage resistance 38.

When the SCR switch is closed, the charges are redistributed through the capacitance 37 of the frame via the earth and the leakage resistance 38. The redistributed current is lower, the resonance frequency being less than in the case where there is ground return path. However, since the current circulates in the building and not in the ground return connection, the stray voltage could be just as high in some of the stalls of the farm.

The case of a phase controller supplying a load at 120 volt is similar. Before the closing of the electronic switch, there is no voltage along the winding that is maintained at neutral voltage via one end of the winding.

When the switch is closed, voltage E is applied at the other end of the winding and the voltage profile is modified along the winding. The transmission mode is still valid. At inductance L and equivalent capacitance C, the discharge current will, however, be reduced by half, because there is no accumulated charge before closing of the switch.

Figure 2A:
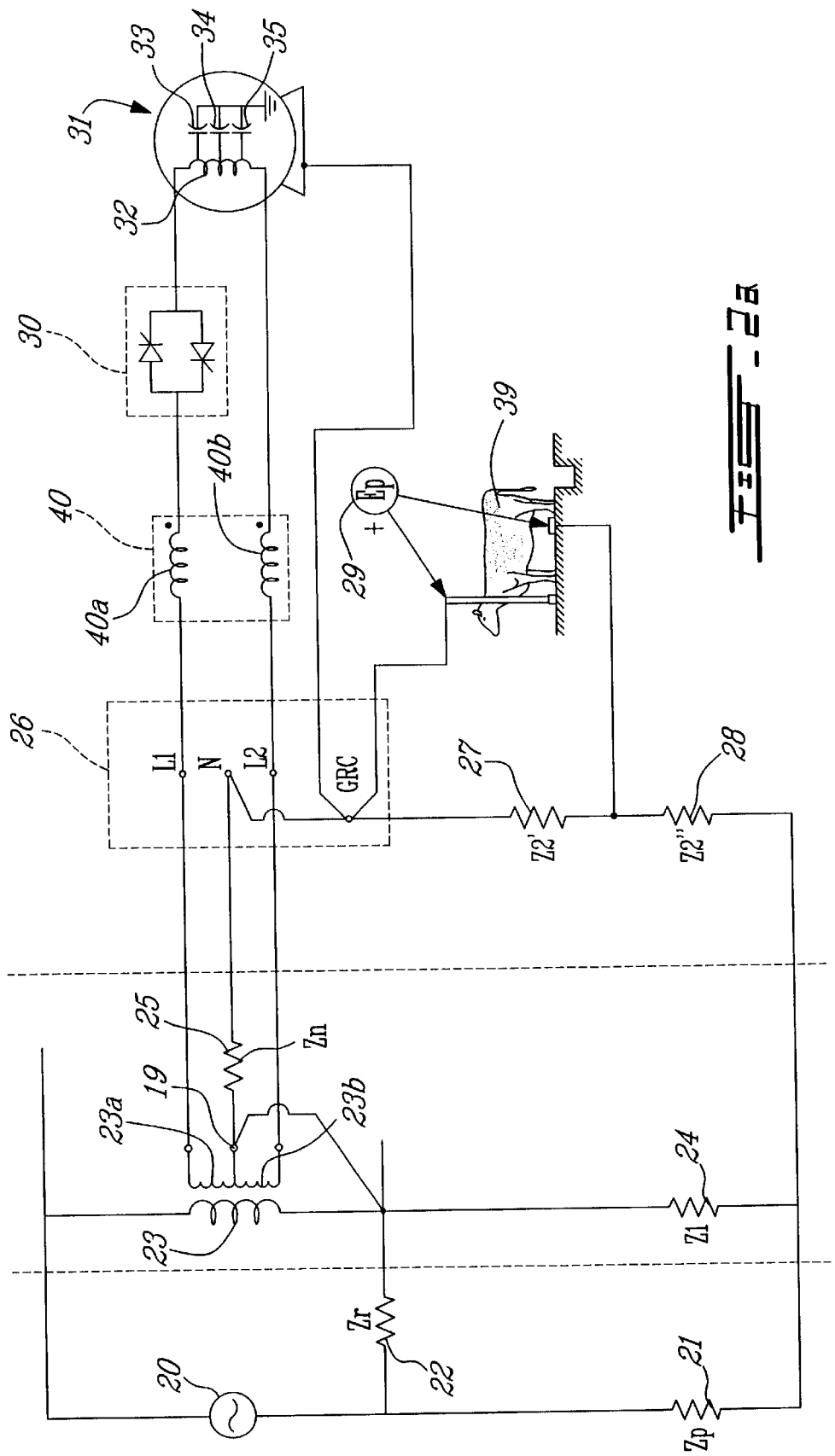
FIG. 2a illustrates an equivalent circuit for a monophased system with variable speed in which the stray current is attenuated having a single-phase supply.

FIG. 2A presents a new common mode filter 40 inserted in series between the utility and the motor.

The common mode filter (common choke coil) 40 comprises a simple core with two coils 40a and 40b.

The Stray Voltage Free (SVF) Filter 40 is made such that two coils 40a and 40b are magnetically coupled via a ferrite core (not shown). Both the first and second coils 40a and 40b are inserted into the input side of this Variable Speed Drive (VSD) power supply.

Coils 40a and 40b have the same number of windings and a summation of ampere turns of these coils 40a and 40b is equal to zero.

Accordingly, the summation of the ampere turns is zero under the normal conditions of use. As a result, the ferrite core of this new filter is not saturated with the magnetic flux.

Under conditions other than normal conditions, namely, when the switching element 30 is alternately turned ON/OFF, the charge/discharge currents will flow through the stray capacitance, so that the above-described relationship is no longer satisfied. However, both coils 40a and 40b of filter 40 function as a high impedance (high inductance) with respect to the switching operations, whereby the charge/discharge currents may be suppressed by filter 40. As a consequence, the voltage drop caused by these charge/discharge currents appearing at the input line may be reduced to a negligible value. The potential variations of the output side of the power supply phase controller with respect to the ground potential may also be reduced to zero.

Placing inductances before a switching motor control prevents impulse current at high frequency to go through. Indeed, the switching motor control produces many components at high frequency on the charge.

The value of the inductance, coupled to the parasitic capacitance of the charge, creates a reactive filter effect. Since it is a reactive effect, the impulse energy is not absorbed. However, from a situation of short and intense impulses, one achieves a situation where there seems to be a permanent regime at low amplitude.

The energy is therefore redistributed in time but since the intensity of the tension achieved is much lower than it would have been, the coupling through the parasitic capacitance is also diminished.

A rectifier circuit, such as a switching motor control, requires a lot of energy from an alternating current supply during the conduction periods of the diodes. The instantaneous current during these periods can be many times the RMS value.

Two extreme cases can occur: sudden lowering of the supply in the area and important demand from the motor.

If, the supply transformer for the area is already close to its maximum capacity, the peaks of current caused by the diodes will saturate the transformer, thereby increasing the high frequency energy available from the circuit.

The high frequencies perturbations come from two sources: the instantaneous demands of the diodes when in the conduction phase and the sudden collapse of the magnetic circuit of the transformer due to an instantaneous surcharge. These phenomenon cause resonance of the transformer. The frequencies of resonance will vary according to the construction of the transformer and, in particular, to its leakage inductance. It is these components at high frequency that are attenuated by the filtering inductances.

The presence of inductance components in series with the supply also limits the amplitude and the frequency of these perturbations.

The filter is introduced between the motor and the phase controller (FIG. 2b), or between the phase controller and the utility (FIG. 2a).

The SVF Filter is typically a high quality reactor designed to present a low reactance value for opposite current circulation (residual mode) and a high reactance value for parallel current circulation (common mode).

Since stray current generated by variable speed drive generally involve the ground return connection, which is not part of the filter core, the SVF Filter presents a very high reactance component value in series with the capacitance component 33, 34, 35 of the motor winding 32. The stray current 136 generated by the capacitance 33, 34, 35 component of the winding 32 still exists but at a much lower amplitude.

Figure 3B:
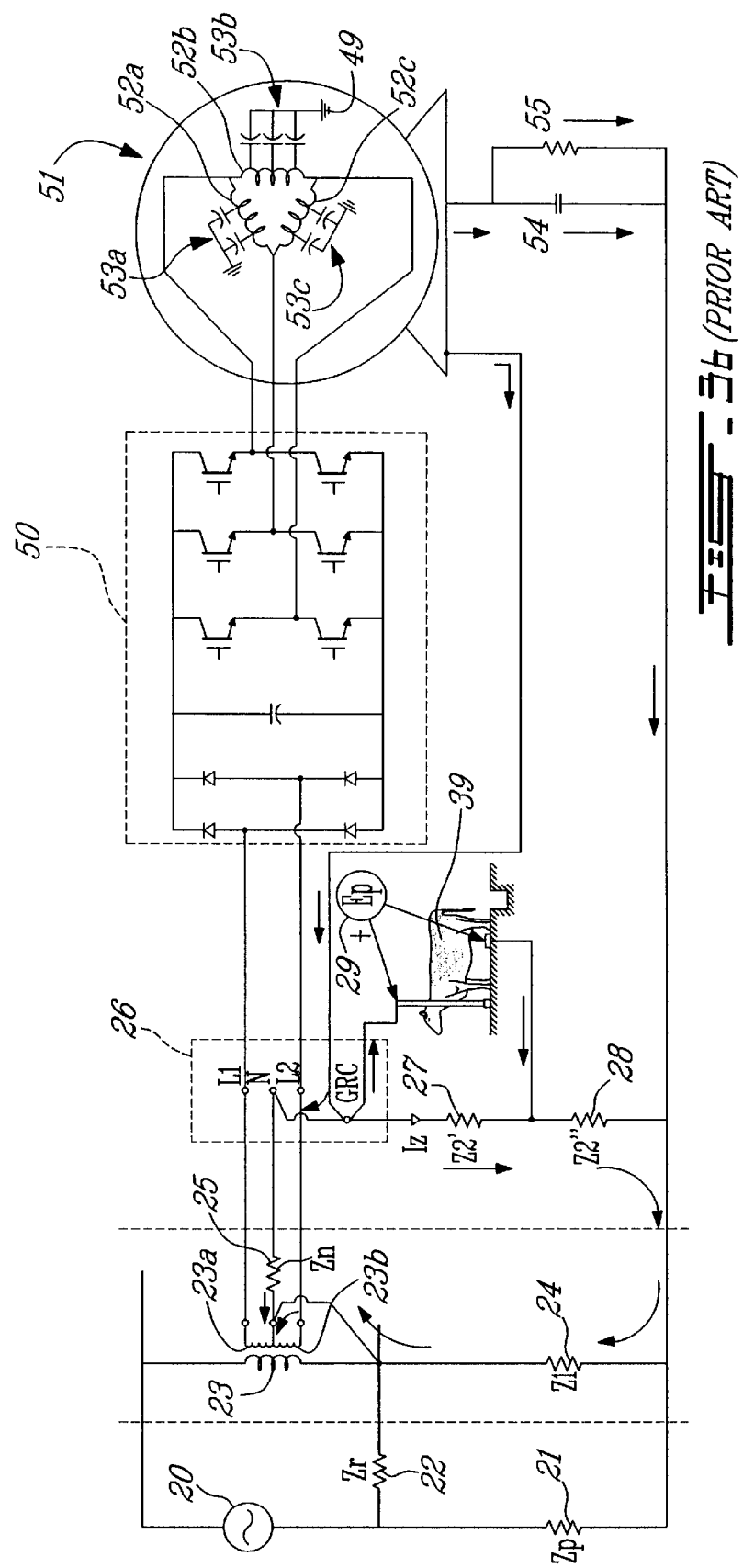
FIG. 3b illustrates a prior art equivalent circuit for a three-phased system with variable speed, in which the motor is not connected to the safety connection, having a single-phase supply.

In the case of a PWM controller 50 with an IGBT device, the motor windings capacitance 53 to the ground 49 are also involved, but the model is more complicated (FIGS. 3a and 3b).

The motor is usually three phased and has three stator windings 52a, 52b and 52c. Each winding has its own capacitance 53 to the ground 49. Each winding is excited to a positive or negative voltage when each IGBT 50a, 50b, 50c, 50d, 50e and 50f device turns on or off according to a pulse wide modulating sequence. The complete circuit is completed by the rectifier section according to the conducting sequence of the diode.

The IGBT device 50 turns on and off typically 10,000 times per second. Each time an IGBT 50a, 50b, 50c, 50d, 50e or 50f turns on or off, a stray current discharge circulates in the motor winding capacitance and the farm ground return system Z2. The typical current frequency is 10 kHz to 1 MHz and the burst is typically 2 or 3 cycles long.

Figure 4A:
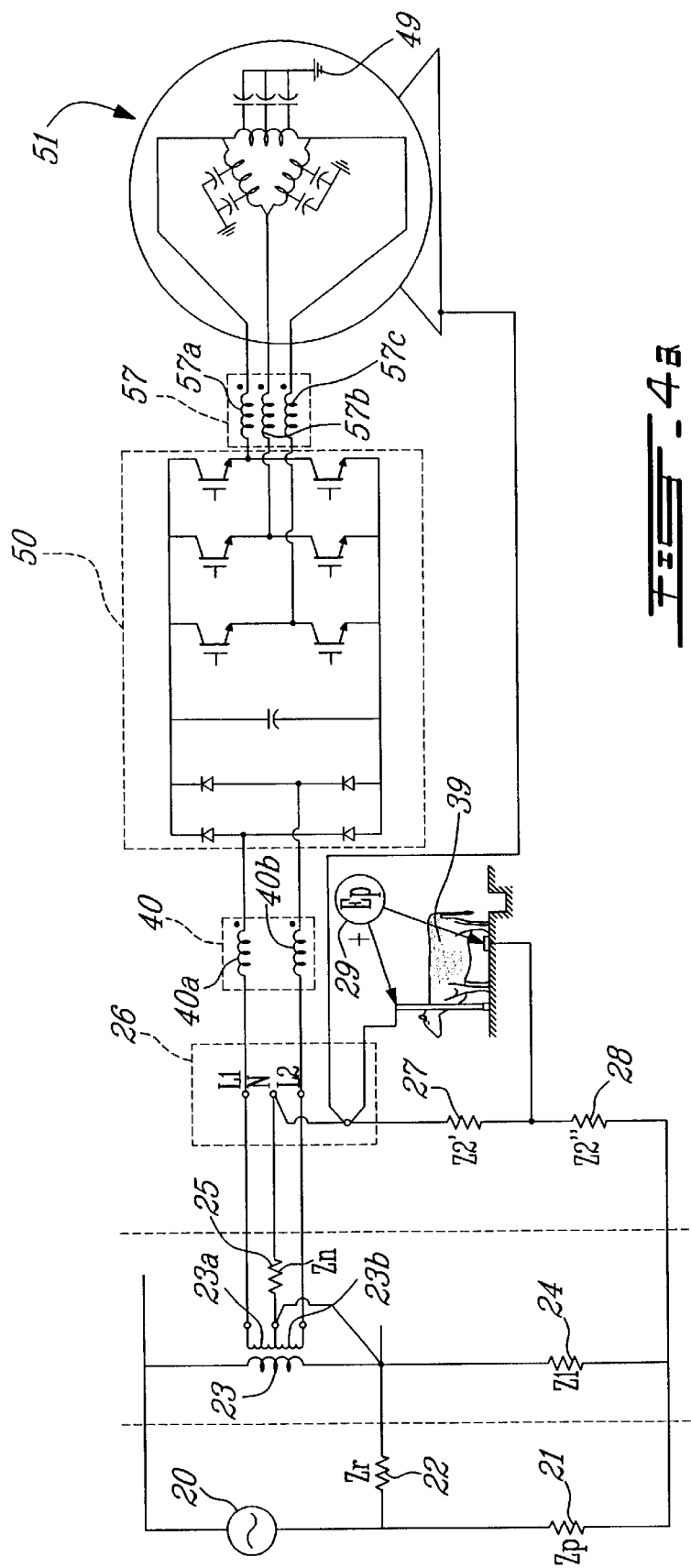
FIG. 4a illustrates an equivalent circuit for a three-phased system with variable speed in which the stray current is attenuated, having a single-phase supply.

FIG. 4a shows a new common mode filter to be inserted in series between the utility and the variable speed controller and between the variable speed controller and the motor The common mode filter (common choke coil) is composed of a simple core with two or three coils depending on the embodiment.

The SVF Filter 40 is as previously described.

The SVF Filter 57 has three coils 57a through c which are magnetically coupled via a ferrite core (not shown). Each of the coils a to c are inserted between the output side of the Variable Speed Drive and the motor.

Coils 57a, 57b and 57c have the same number of windings and a summation of ampere turns of these coils 57a through 57c is equal to zero.

Accordingly, the summation of the ampere turns is zero under the normal condition. As a result, the ferrite core of this new filter is not saturated with the magnetic flux. Again, the stray current is attenuated.

FIG. 4b shows a new common mode filter to be inserted in series between the utility and the variable speed controller and between the variable speed controller and the motor. The supply is three-phased and the motor is three-phased.

The SVF Filter 40' has three coils which are magnetically coupled via a ferrite core. The coils have the same number of windings and a summation of ampere turns of these coils is equal to zero.

Accordingly, the summation of the ampere turns is zero under the normal condition. As a result, the ferrite core of this new filter is not saturated with the magnetic flux. Again, the stray current is attenuated.

The SVF Filter 57 is as previously described.

Figure 5:
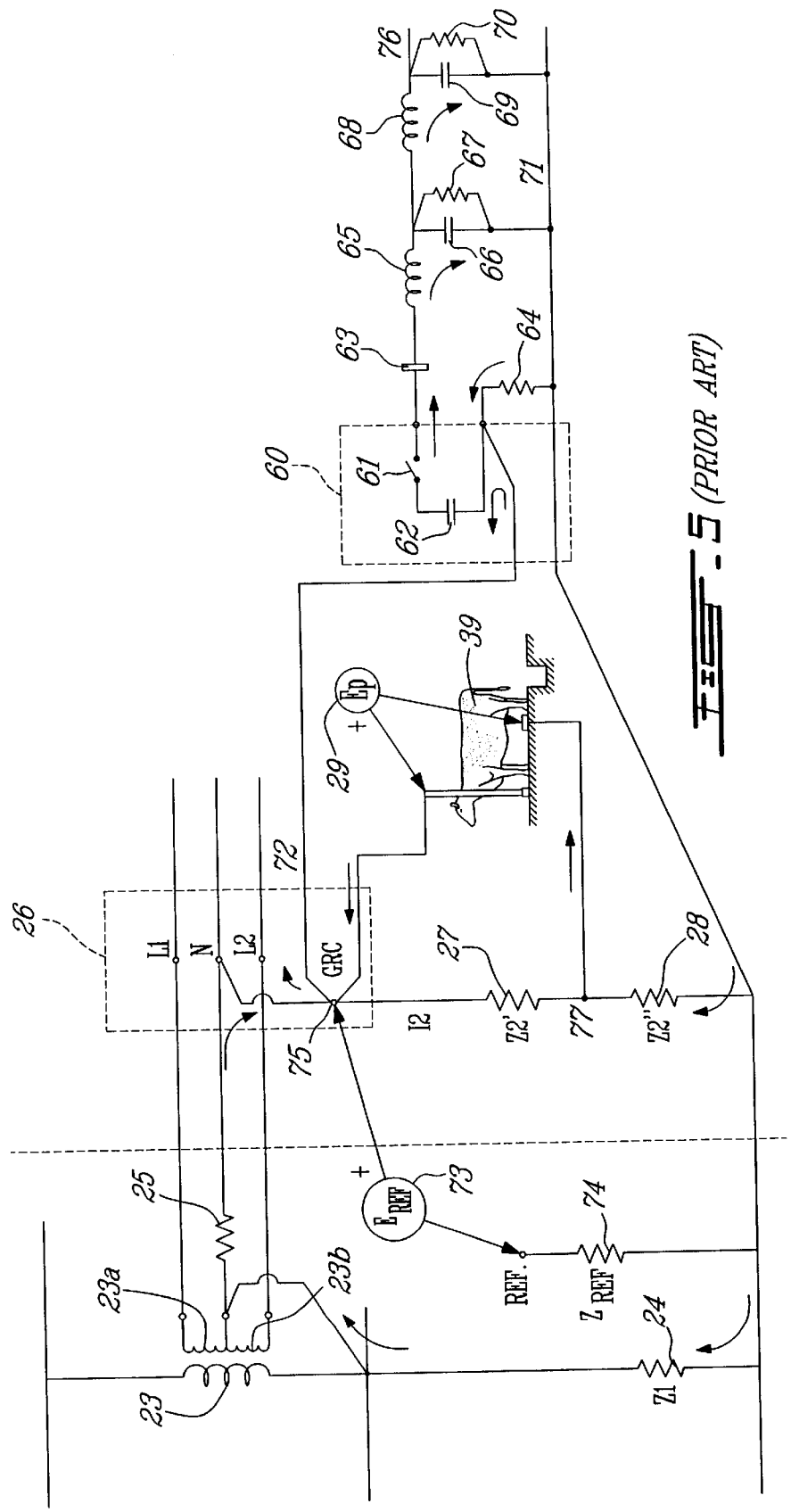
FIG. 5 illustrates the prior art circuit of Example 1.

As shown in FIG. 5, electric fences, from the standpoint of magnitude, are the most important source of stray voltages in livestock environments. Stray voltages 73 as high as 10 V peak were measured. However, these voltages only last 60 μs and are repeated every second. They can be qualified as low-repetition pulses.

The purpose of the electric fence is to keep livestock in precise locations. The electric fence consists of three elements: the electric fence controller 60; the conductor wire 63; the ground electrode 64.

The electric fence controller 60 produces a high-voltage electric impulse, at intervals of usually one second, on the conductor wire 63. Any animal that touches the conductor wire 63 and the ground 71 will receive an electric discharge.

The characteristics of electric fence controller 60 vary depending on the model.

From the standpoint of electricity, the electric fence 60 system consists of a charged capacitor 62 that suddenly discharges on a transmission line composed of capacitive 66, inductive 65 and resistive 67 elements.

Two situations occur:

1. An animal touches the conductor wire 63. Its impedance to the ground is low, insignificant in relation to the shunt capacitance and earth-leakage resistance. The electric fence controller 60 is discharged like an RC circuit. If the discharge is very far from the controller 60, there could be a low-frequency oscillation between the reactance of the conductor wire 63 and the capacitor 62 of the electric fence controller (RLC circuit).
2. The conductor wire 63 is free of obstacles. The voltage of the controller 60 is distributed over the entire transmission line 76, which the conductor wire 63 constitutes. There will be switching impulses 61, with multiple reflections. The conductor wire 63 will eventually discharge into the earth 71 via the earth-leakage resistance 67 or a discharge circuit in the controller.

The series reactance of a No. 18 AWG conductor wire 63 installed 80 cm from the ground is calculated using this equation:

$$L = 0.0004605 \rho \left\{ \log_{10} \left[ \frac{2h}{a} \left( \frac{l + \sqrt{l^2 + a^2}}{l + \sqrt{l^2 + 4h^2}} \right) \right] \right\} + 0.0002 \left( \sqrt{b^2 + 4h^2} - \sqrt{b^2 + a^2} + \frac{b}{4} - 2h + a \right)$$

where, L is the inductance in micro Henry per unit length, a is the radius of the conductor wire in mm, (0.5 mm for No. 18 gauge), h is the height of the wire from the ground in mm, I is the length of the wire in mm.

For a length of 1 meter, the inductance L of the wire will be 1.44 micro meter/meter.

Again for a length of 1 meter, the capacitance of the same conductor wire is calculated as:

$$C = \frac{l}{60 c \ln \frac{2h}{a}} = 3.7 \text{ pico-farad/meter}$$

where, C: the capacitance, in farad, a: the radius of the conductor, in meters, c: the speed of light ($3 \times 10^2$ m/sec), h: the height of the wire from the ground, in meters, I: the length of the wire.

The characteristic impedance of the electric fence will be:

$$Zc = \sqrt{\frac{L}{C}}$$

$$Zc = \sqrt{\frac{1.44 \text{ μH/m}}{3.7 \text{ pf/m}}}$$

Zc=623 ohms

The transit time of the pulse along the conductor wire is assumed equal to the speed of light ($\pi$=2,3×10-9 sec/meter)

If the length of the conductor wire is 1 km, the transit of the pulse from one end of the fence to the other will be:

T=1000 m/2.97×10⁸ m/sec

T=3.37 μsec

The resonance frequency of the electric fence will correspond to the reverse of four times the transit time, that is:

$$f = \frac{1}{4T}$$

f=74 kHz

If the same fence is now 2 km long, the resonance frequency will decrease to 37 kHz.

The resonance frequency varies mostly according to the length of the fence. The longer the fence, the lower the frequency.

The peak discharge current for the fence is calculated as follows:

I=Emax/Zc

I=5 kV/623 ohms

I=8 amperes

It is independent of the length of the fence. This current will be higher if there are several conductor wires parallel-connected to the fence.

The preferred SVF filter has the following characteristics. The ferrite is manufactured by Magnetics (a division of Spang & Co.) and the ferrite number is OJ 48613 TC (high permeability material, 5000u).

The nomenclature chosen for the SVF filters is as follows:

TABLE 2

Nomenclature chosen for the SVF filters used for electronic ventilation
SVF Filters - electronic ventilation

|  | 120 V | 240 V |
|---|---|---|
| 4A | FV1A04 | FV1B04 |
| 10A | FV1A10 | FV1B10 |

The nomenclature chosen for the SVF filters used for electrical fences is as follows:

TABLE 3

Nomenclature chosen for the SVF filters used for electrical fences
SVF Filters - electrical fences

|  | on Z2 | with cord |
|---|---|---|
| <201A | FF200A |  |
| >200A | FF201A |  |
| 3A, 120V |  | FF3A00 |

The nomenclature chosen for the SVF filters used for variable speed circuits with line reactors is as follows:

TABLE 4

Nomenclature chosen for the SVF filters used for variable speed circuits with line reactors
SVF Filters - variable speed (with line reactors)

|  | monophased | triphased | | |
|---|---|---|---|---|
|  | 240 V | 240 V | 480 V | 600 V |
| 0,5 H.P. | FW1B5C | FW3B5C |  |  |
| 0,75 H.P. | FW1B7C | FW3B7C |  |  |
| 1,0 H.P. | FW1B01 | FW3B01 | FW3C01 | FW3D01 |
| 1,5 H.P. | FW1B1C |  | FW3C1C | FW3D1C |
| 2,0 H.P. | FW1B02 | FW3B02 | FW3C02 | FW3D02 |
| 3,0 H.P. | FW1B03 | FW3B03 | FW3C03 | FW3D03 |
| 5,0 H.P. | FW1B05 | FW3B05 | FW3C05 | FW3D05 |
| 7,5 H.P. | FW1B07 | FW3B07 | FW3C07 | FW3D07 |
| 10,0 H.P. | FW1B10 | FW3B10 | FW3C10 | FW3D10 |
| 15,0 H.P. | FW1B15 | FW3B15 | FW3C15 | FW3D15 |
| 20,0 H.P. | FW1B20 | FW3B20 | FW3C20 | FW3D20 |
| 25,0 H.P. | FW1B25 | FW3B25 | FW3C25 | FW3D25 |
| 30,0 H.P. |  |  | FW3C30 | FW3D30 |
| 40,0 H.P. |  |  | FW3C40 | FW3D40 |
| 50,0 H.P. |  |  | FW3C50 | FW3D50 |
| 60,0 H.P. |  |  |  | FW3D60 |

The nomenclature chosen for the SVF filters used for variable speed circuits without line reactors is as follows:

TABLE 5

Nomenclature chosen for the SVF filters used for variable speed circuits without line reactors.
SVF Filters - variable speed (without line reactors)

|  | monophased | triphased | | |
|---|---|---|---|---|
|  | 240 V | 240 V | 480 V | 600 V |
| 0,5 H.P. | FZ1B5C | FZ3B5C |  |  |
| 0,75 H.P. | FZ1B7C | FZ3B7C |  |  |
| 1,0 H.P. | FZ1B01 | FZ3B01 | FZ3C01 | FZ3D01 |
| 1,5 H.P. | FZ1B1C |  | FZ3C1C | FZ3D1C |
| 2,0 H.P. | FZ1B02 | FZ3B02 | FZ3C02 | FZ3D02 |
| 3,0 H.P. | FZ1B03 | FZ3B03 | FZ3C03 | FZ3D03 |
| 5,0 H.P. | FZ1B05 | FZ3B05 | FZ3C05 | FZ3D05 |
| 7,5 H.P. | FZ1B07 | FZ3B07 | FZ3C07 | FZ3D07 |
| 10,0 H.P. | FZ1B10 | FZ3B10 | FZ3C10 | FZ3D10 |
| 15,0 H.P. | FZ1B15 | FZ3B15 | FZ3C15 | FZ3D15 |
| 20,0 H.P. | FZ1B20 | FZ3B20 | FZ3C20 | FZ3D20 |
| 25,0 H.P. | FZ1B25 | FZ3B25 | FZ3C25 | FZ3D25 |
| 30,0 H.P. |  |  | FZ3C30 | FZ3D30 |
| 40,0 H.P. |  |  | FZ3C40 | FZ3D40 |
| 50,0 H.P. |  |  | FZ3C50 | FZ3D50 |
| 60,0 H.P. |  |  |  | FZ3D60 |

The nomenclature chosen for the SVF filters used for multi-usage circuits is as follows:

TABLE 6

Nomenclature chosen for the SVF filters used for multi-usage circuits
SVF Filters - multi-uses

|  | monophased | | triphased | | |
|---|---|---|---|---|---|
|  | 120 V | 240 V | 120/240 V | 600 V | 347/600 V |
| 10A, with cord | FM1F10 |  |  |  |  |
| 12A | FM1A12 | FM1B12 | FM1G12 | FM3D12 | FM3E12 |
| 16A | FM1A16 | FM1B16 | FM1G16 | FM3D16 | FM3E16 |
| 24A | FM1A24 | FM1B24 | FM1G24 | FM3D24 | FM3E24 |
| 32A | FM1A32 | FM1B32 | FM1G32 | FM3D32 |  |

What follows is the detail of the characteristics of the SVF filters for each of the different application types. For the VSD-IGBT Section, the characteristics of the SVF filters when there is a line reactor are as follows:

TABLE 7

Characteristics of the SVF filters for the VSD-IGBT Section (with a line reactor).

| # SVF | amps | Q | # ferrite | # wires | # turns | Impedance at 5 kHz | Impedance at 20 kHz | Impedance at 40 kHz |
|---|---|---|---|---|---|---|---|---|
| F11A3Q | 15 | 3 | 2 | 3 | 15 | 33 ohms | 238 ohms | 566 ohms |
| F22A3Q | 30 | 3 | 3 | 3 | 12 | 32.8 ohms | 247 ohms | 533 ohms |
| F32A3Q | 45 | 3 | 5 | 3 | 10 | 41.5 ohms | 282 ohms | 612 ohms |
| F52A3Q | 65 | 3 | 8 | 3 | 8 | 43.9 ohms | 294 ohms | 634 ohms |
| F68A3Q | 85 | 3 | 9 | 3 | 7 | 50.9 ohms | 327 ohms | 719 ohms |
| F11A1Q | 15 | 1 | 2 | 2 | 15 | 33 ohms | 238 ohms | 566 ohms |
| F22A1Q | 30 | 1 | 3 | 2 | 12 | 36.6 ohms | 226 ohms | 454 ohms |

TABLE 7-continued

Characteristics of the SVF filters for the VSD-IGBT Section (with a line reactor).

| # SVF | amps | Q | # ferrite | # wires | # turns | Impedance at 5 kHz | Impedance at 20 kHz | Impedance at 40 kHz |
|---|---|---|---|---|---|---|---|---|
| F32A1Q | 45 | 1 | 5 | 2 | 10 | 36.6 ohms | 226 ohms | 454 ohms |
| F52A1Q | 65 | 1 | 8 | 2 | 8 | 43.9 ohms | 294 ohms | 634 ohms |
| F68A1Q | 85 | 1 | 9 | 2 | 7 | 50.9 ohms | 327 ohms | 719 ohms |

For the VSD-IGBT Section, the characteristics of the SVF filters without a line reactor are as follows:

TABLE 8

Characteristics of the SVF filters for the VSD-IGBT Section (without a line reactor).

| # SVF | amps | Q | # ferrite | # wires | # turns | Impdedance at 5 KHz | Impedance at 20 KHz | Impendance at 40 KHz |
|---|---|---|---|---|---|---|---|---|
| F11B3Q | 15A | 3 | 2 | 3 | 22 | 106 ohms | 586 ohms | 1312 ohms |
| F22B3Q | 30A | 3 | 3 | 3 | 18 | 105 ohms | 572 ohms | 1268 ohms |
| F32B3Q | 45A | 3 | 7 | 3 | 12 | 108 ohms | 589 ohms | 1327 ohms |
| F52B3Q | 65A | 3 | 10 | 3 | 10 | 104 ohms | 584 ohms | 1316 ohms |
| F68B3Q | 85A | 3 | 12 | 3 | 9 | 101 ohms | 570 ohms | 1279 ohms |
| F11B1Q | 15A | 1 | 2 | 2 | 22 | 106 ohms | 586 ohms | 1312 ohms |
| F22B1Q | 30A | 1 | 3 | 2 | 18 | 105 ohms | 572 ohms | 1268 ohms |
| F32B1Q | 45A | 1 | 4 | 2 | 16 | 108 ohms | 589 ohms | 1327 ohms |
| F52B1Q | 65A | 1 | 6 | 2 | 13 | 104 ohms | 584 ohms | 1316 ohms |
| F68B1Q | 85A | 1 | 6 | 2 | 13 | 101 ohms | 570 ohms | 1279 ohms |

For the SCR Section, the characteristics of the SVF filters are as follows:

TABLE 9

Characteristics of the SVF filters for the SCR section

| # SVF | amps | Q | # ferrite | # wires | # turns | Impedance at 5 kHz | Impedance at 20 kHz | Impedance at 40 kHz |
|---|---|---|---|---|---|---|---|---|
| FV1A04 | 4 | 1 | 1 | 2 | 36 | 169 ohms | 858 ohms | 1859 ohms |
| FV1A10 | 10 | 1 | 1 | 2 | 36 | 169 ohms | 858 ohms | 1859 ohms |
| FV1B04 | 4 | 1 | 1 | 2 | 36 | 169 ohms | 858 ohms | 1859 ohms |
| FV1B10 | 10 | 1 | 1 | 2 | 36 | 169 ohms | 858 ohms | 1859 ohms |

For the fencer Section, the characteristics of the SVF filters are as follows:

TABLE 10

Characteristics of the SVF filters for the fencer section

| # SVF | amps | Q | # ferrite | # wires | # turns | Impedance at 5 kHz | Impedance at 20 kHz | Impedance at 40 kHz |
|---|---|---|---|---|---|---|---|---|
| FF200A | <200A |  | 4 | 2 | 15 | 234 ohms | 1100 ohms | 2350 ohms |
| FF201A | >200A |  | 6 | 4 | 12 | 138 ohms | 707 ohms | 1526 ohms |
| FF3A00 | 3 | 1 | 1 | 3 | 95 | 901 ohms | 3882 ohms | 9300 ohms |

For the Multi-Uses Section, the characteristics of the SVF filters are as follows:

TABLE 11

Characteristics of the SVF filters for the multi-uses section

| # SVF | amps | Q | # ferrite | # wires | # turns | Impedance at 5 kHz | Impedance at 20 kHz | Impedance at 40 kHz |
|---|---|---|---|---|---|---|---|---|
| FM1A12 | 12 | 1 | 1 | 2 | 36 | 179 ohms | 882 ohms | 1829 ohms |
| FM1A16 | 16 | 1 | 1 | 2 | 36 | 179 ohms | 882 ohms | 1829 ohms |
| FM1A24 | 24 | 1 | 2 | 2 | 26 | 178 ohms | 882 ohms | 1829 ohms |
| FM1A32 | 32 | 1 | 5 | 2 | 16 | 166 ohms | 819 ohms | 1744 ohms |
| FM1B12 | 12 | 1 | 1 | 2 | 36 | 179 ohms | 882 ohms | 1829 ohms |
| FM1B16 | 16 | 1 | 1 | 2 | 36 | 179 ohms | 882 ohms | 1829 ohms |
| FM1B24 | 24 | 1 | 2 | 2 | 26 | 178 ohms | 880 ohms | 1829 ohms |
| FM1B32 | 32 | 1 | 5 | 2 | 16 | 166 ohms | 819 ohms | 1744 ohms |
| FM1C12 | 12 | 1 | 1 | 3 | 36 | 179 ohms | 882 ohms | 1829 ohms |
| FM1C16 | 16 | 1 | 1 | 3 | 36 | 179 ohms | 882 ohms | 1829 ohms |
| FM1C24 | 24 | 1 | 2 | 3 | 26 | 166 ohms | 819 ohms | 1744 ohms |
| FM1C32 | 32 | 1 | 5 | 3 | 16 | 178 ohms | 883 ohms | 1839 ohms |
| FM1D12 | 12 | 3 | 1 | 3 | 36 | 179 ohms | 882 ohms | 1829 ohms |
| FM1D16 | 16 | 3 | 1 | 3 | 36 | 178 ohms | 880 ohms | 1829 ohms |
| FM1D24 | 24 | 3 | 5 | 3 | 16 | 166 ohms | 819 ohms | 1744 ohms |
| FM1D32 | 32 | 3 | 7 | 3 | 14 | 168 ohms | 822 ohms | 1810 ohms |
| FM1E12 | 12 | 3 | 1 | 4 | 36 | 179 ohms | 882 ohms | 1830 ohms |
| FM1E16 | 16 | 3 | 2 | 4 | 26 | 166 ohms | 819 ohms | 1744 ohms |
| FM1E24 | 24 | 3 | 5 | 4 | 16 | 166 ohms | 819 ohms | 1744 ohms |

EXAMPLE 1

The grounding electrode 64 of the electric fencing system 60 is connected to the grounding system 77 of the dairy farm (FIG. 5).

Some electric fence controllers 60 have their dedicated grounding electrode 64 tied to the grounding 77 of the dairy farm via the third prong 72 of the power receptacle. In this case, the grounding electrode 64 of the electric fence system 60 is insignificant as compared to the importance of the ground return 24 that the utility and the dairy farm 77 represent. The return current to the electric fence 60 controller will travel via both the ground return network of the utility 24 and the ground return network 77 of the dairy farm (Z2).

There will be a stray voltage 73 in the livestock environment 29. This voltage will be proportional to the return current that circulates in impedance Z2' 77.

$$Ep = I2 \times Z2'$$

The magnitude of the stray voltage 73 in the livestock environment 77 will vary from stall to stall in the dairy barn. It will be increasingly greater as the stall gets further from the center of the zone of influence of the ground return electrode of the dairy farm.

Voltage 73 will also be produced between the reference electrode 74 and the neutral connection 75 of the dairy barn. This voltage 73 will be proportional to the return current that circulates in impedance Z2 77.

$$E\ ref = I2 \times (Z2' + Z2'')$$

This example can produce stray voltages of very high magnitude in the livestock environment.

FIG. 6 shows a new common mode filter which can be inserted in series between the utility and the electrified controller, for the circuitry of Example 1.

The common mode filter (common choke coil) is composed of a simple core with three coils. The SVF Filter 57 is designed similarly to the SVF filter 57 previously described with respect to FIG. 4.

Figure 7:
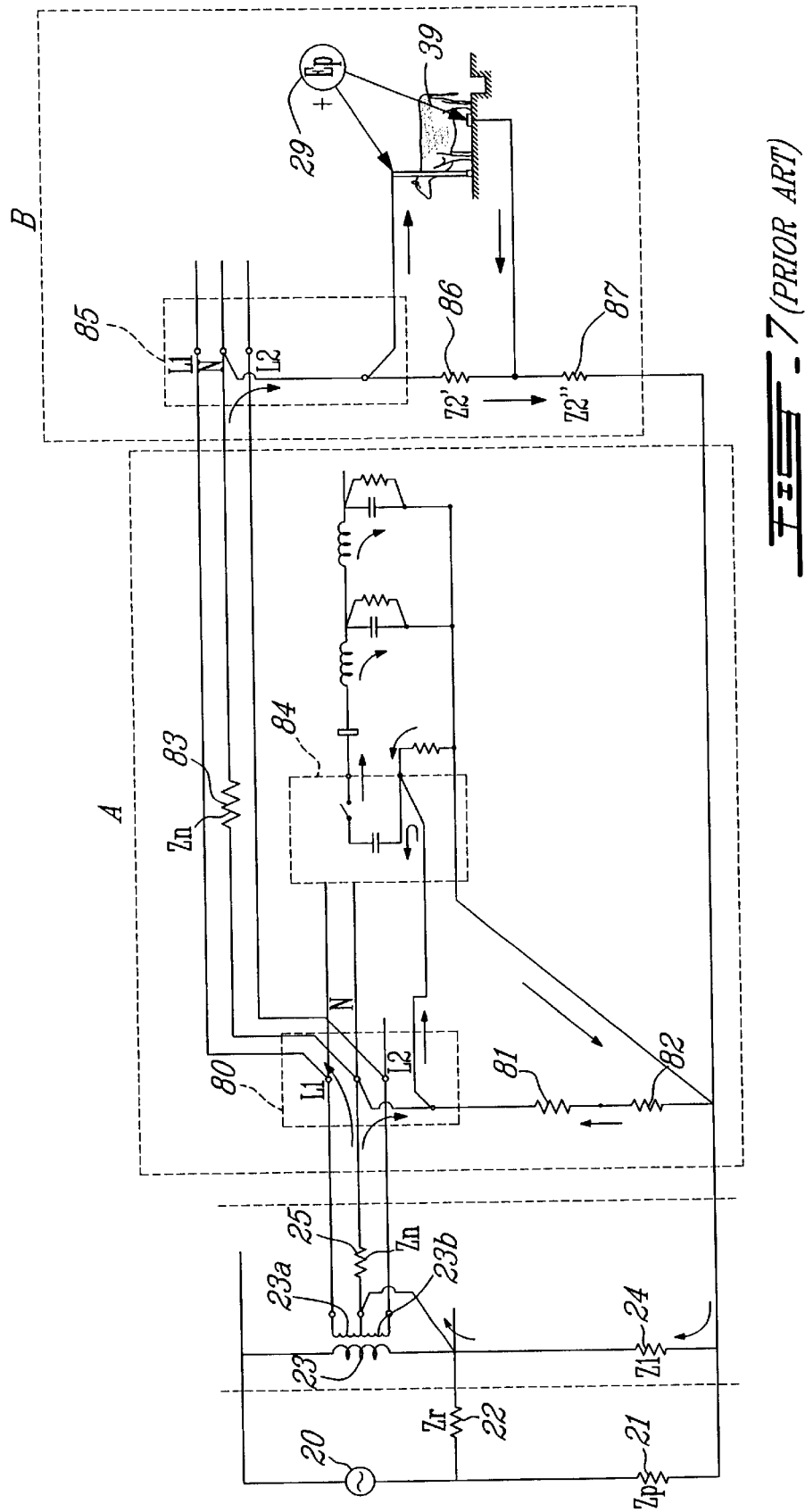
FIG. 7 illustrates the prior art circuit of Example 2.

In the example described above, it can be noted that part of the return current toward the electric fence controller 60 circulates by the grounding network of the utility 24. The grounding network 24 of the utility is in fact made up of the grounding electrodes of the utility but also of neighboring customer. As shown in FIG. 7, it is therefore possible, in the livestock environment 77 of farm <<B>>, to measure stray voltage whose source is the electric fence system of a neighboring farm <<A>>. For farm <<B>>, the transmission mode is therefore similar to example 1.

Figure 8:
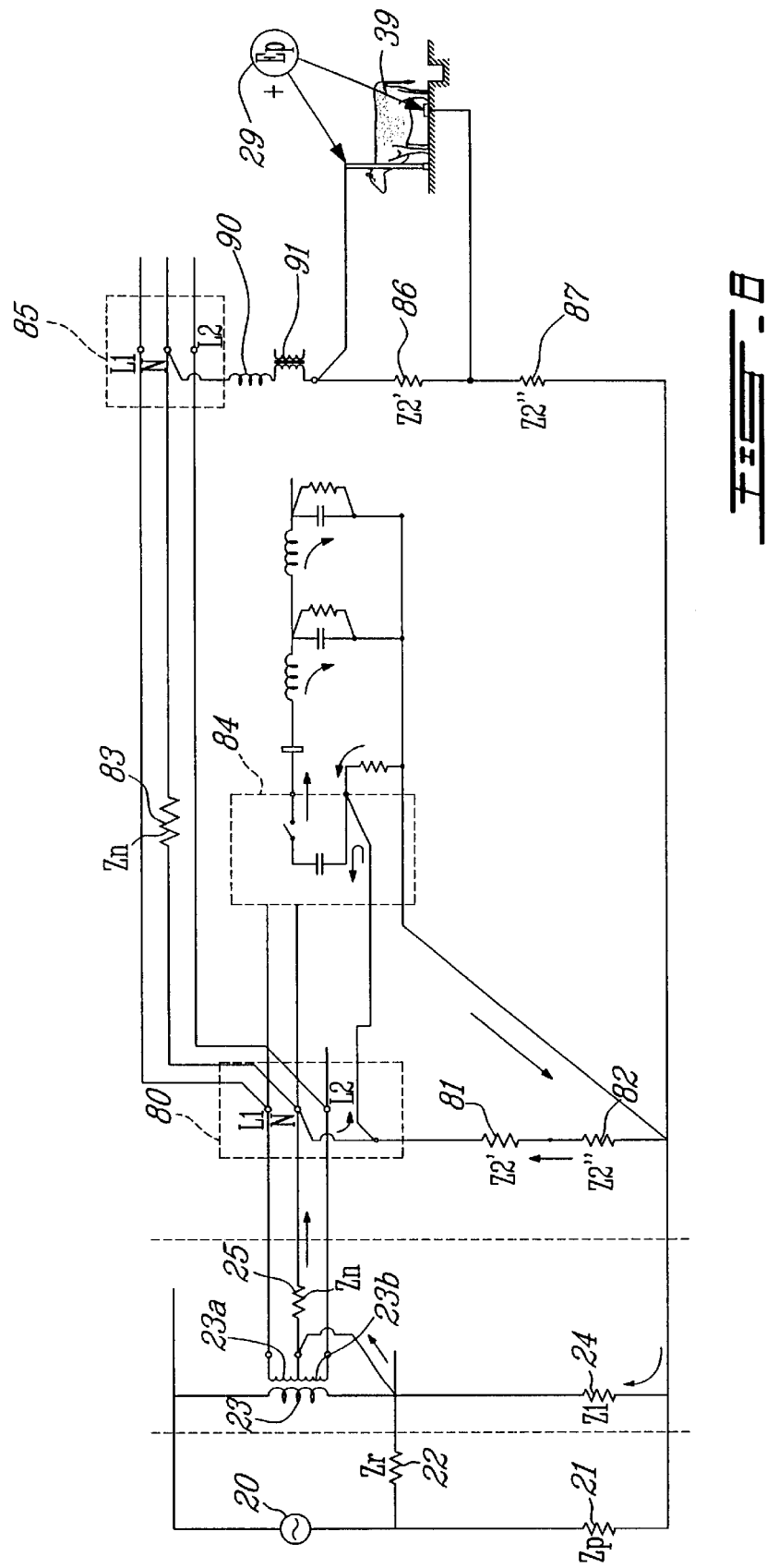
FIG. 8 illustrates the equivalent electrical circuit for an electrified controller in which the stray current is attenuated.
Figure 9:
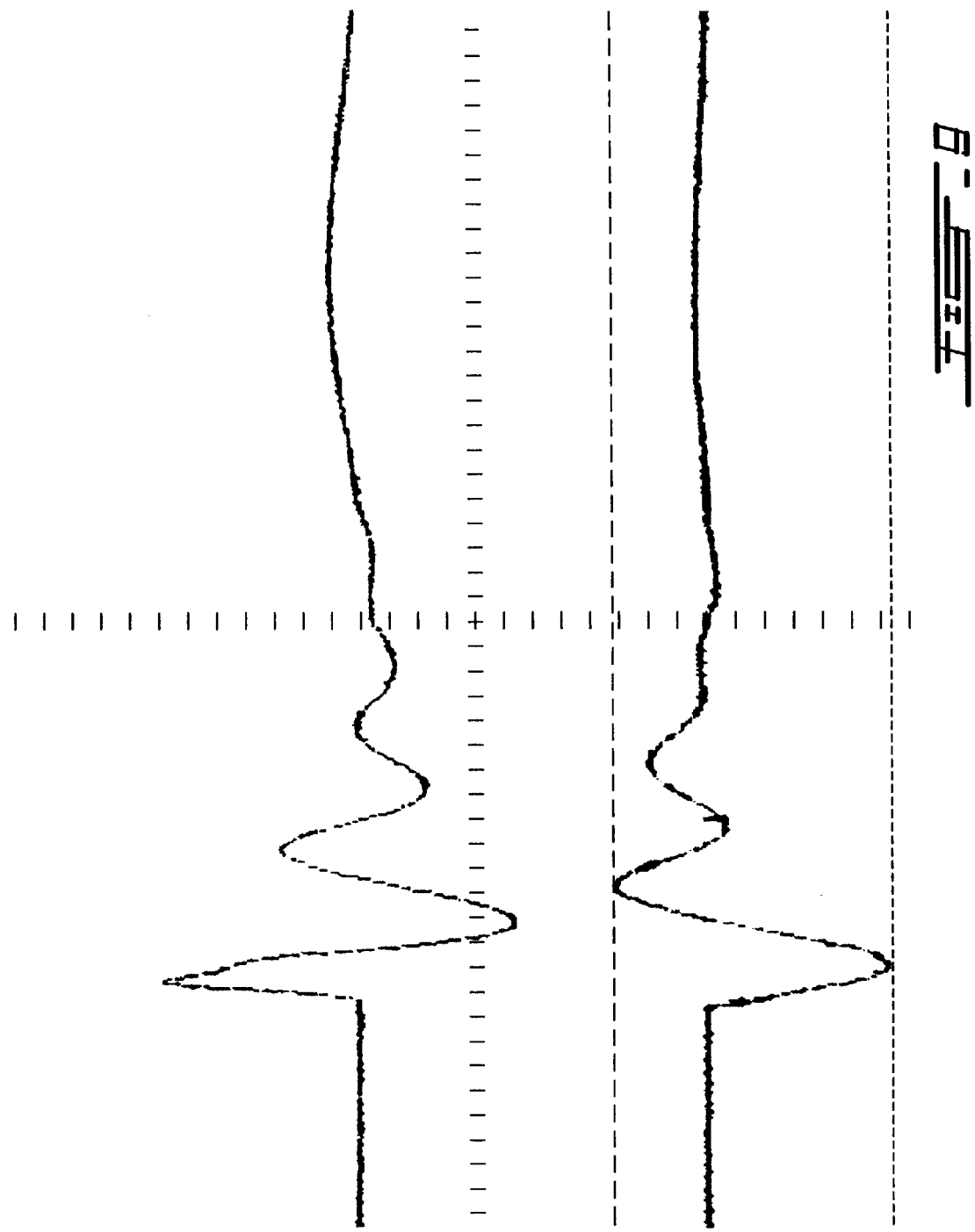

FIG. 8 presents a new filter in common mode inserted between the neutral network (N) and the earth grounding network (Z2). The SVF Filter is so constructed that one coil windings is magnetically coupled via a ferrite core (not shown). Both the coil windings is inserted into the connection N and Z2.

The common mode filter (common choke coil) is composed of a simple ferrite core with one coil. The coil is connected between the Neutral N and the earth grounding network Z2.

Since a portion of the primary current circulates through Z2, the SVF filter is normally saturated. The saturation occurs at more than 150 mA 60 Hz. To prevent saturation, the SVF filter must be installed with a mitigation of 60 Hz.

Consequently, the discharge current is limited to the electrical current of the electrified controller. The high impedance (reactance) of the SVF filter prevents the impulse current to circulate in farm <<B>>.

Figure 9:
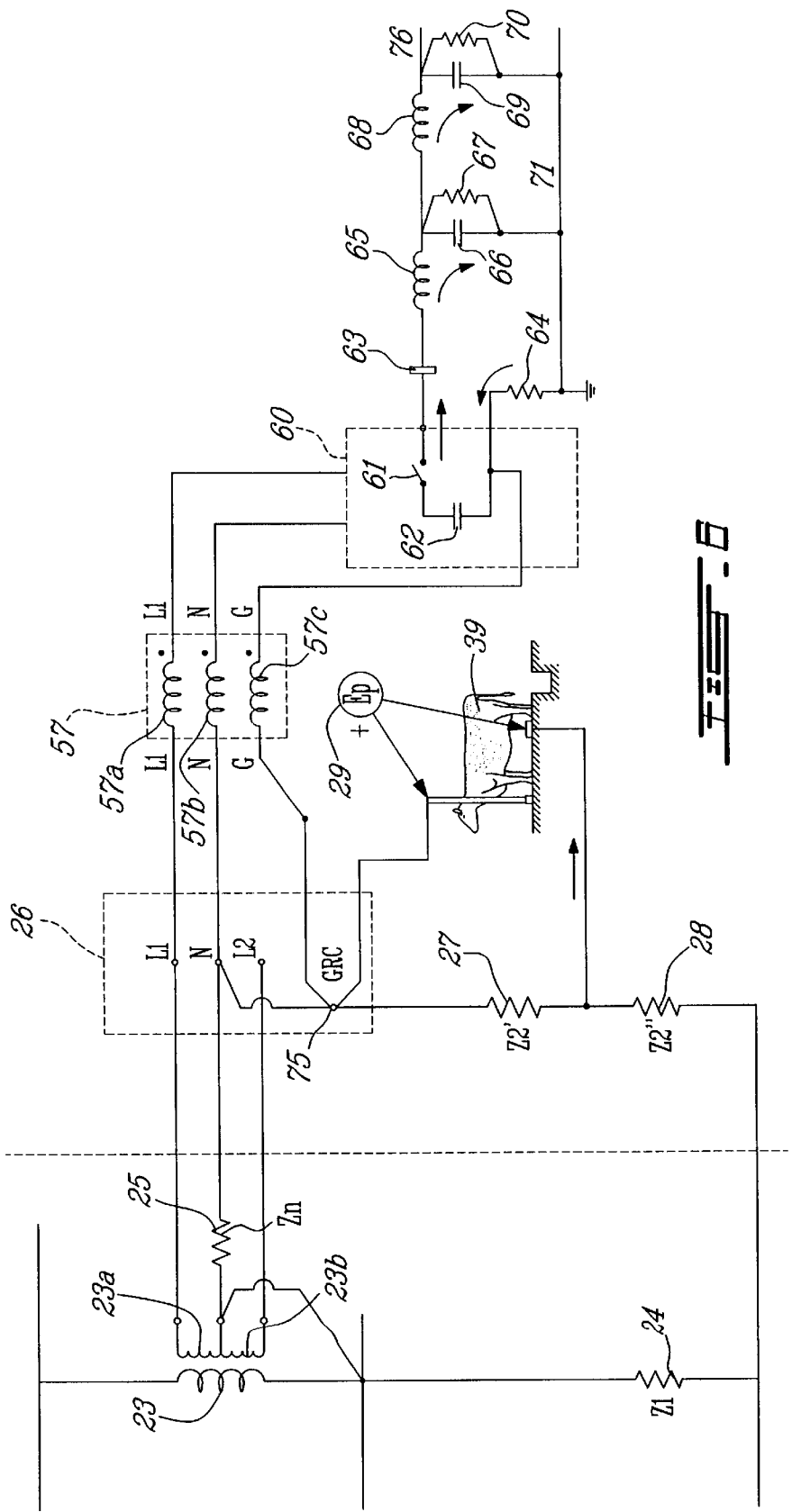
FIG. 9 illustrates the impulses of an electrified controller.

Shown in FIG. 9 is the impulse of an electrified controller. The first part is characterized by a rapid oscillation, usually of a frequency higher than 50 kHz for 3 or 4 cycles and very attenuated, followed by a low amplitude wave attributable to the discharge in the earth leakage resistance of the fence. The rapid oscillations last less than 80 $\mu$s and vary according to the geometry of the fence. The discharge range is over 400 $\mu$s and varies according to the quality of the installation and the weather conditions. Coupling also varies according to the temperature of the soils.

The maximum magnitude is reached at the first half-cycle, in the first 5 micro-seconds. It varies according to the coupling between the ground return network of the barn and the ground return electrode of the electric fence system. Magnitudes of around 5 V peak are common and have been recorded at several farms.

The impulse of an electrified controller after mitigation does not need to be shown since the impedance (reactance) value is sufficiently high to completely attenuate the impulse of the electrified controller.

Figure 10:
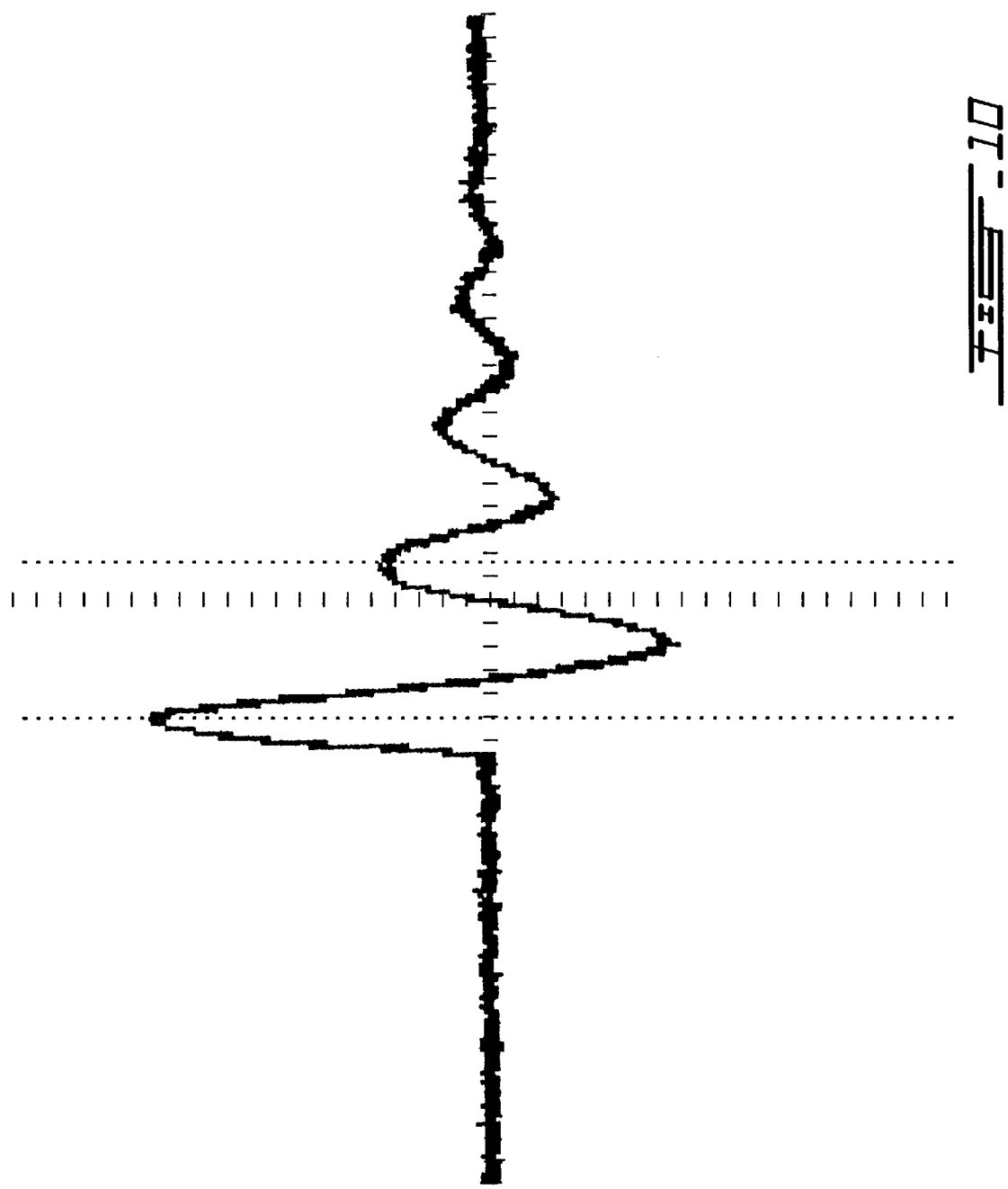
FIG. 10 illustrates the impulse of the phase controller.

FIG. 10 shows the impulse of a phase controller the SCR device turns on and off 120 times per second (twice per cycle). The typical current frequency is 70 kHz and the burst is typically 2 or 3 cycles.

Figure 11:
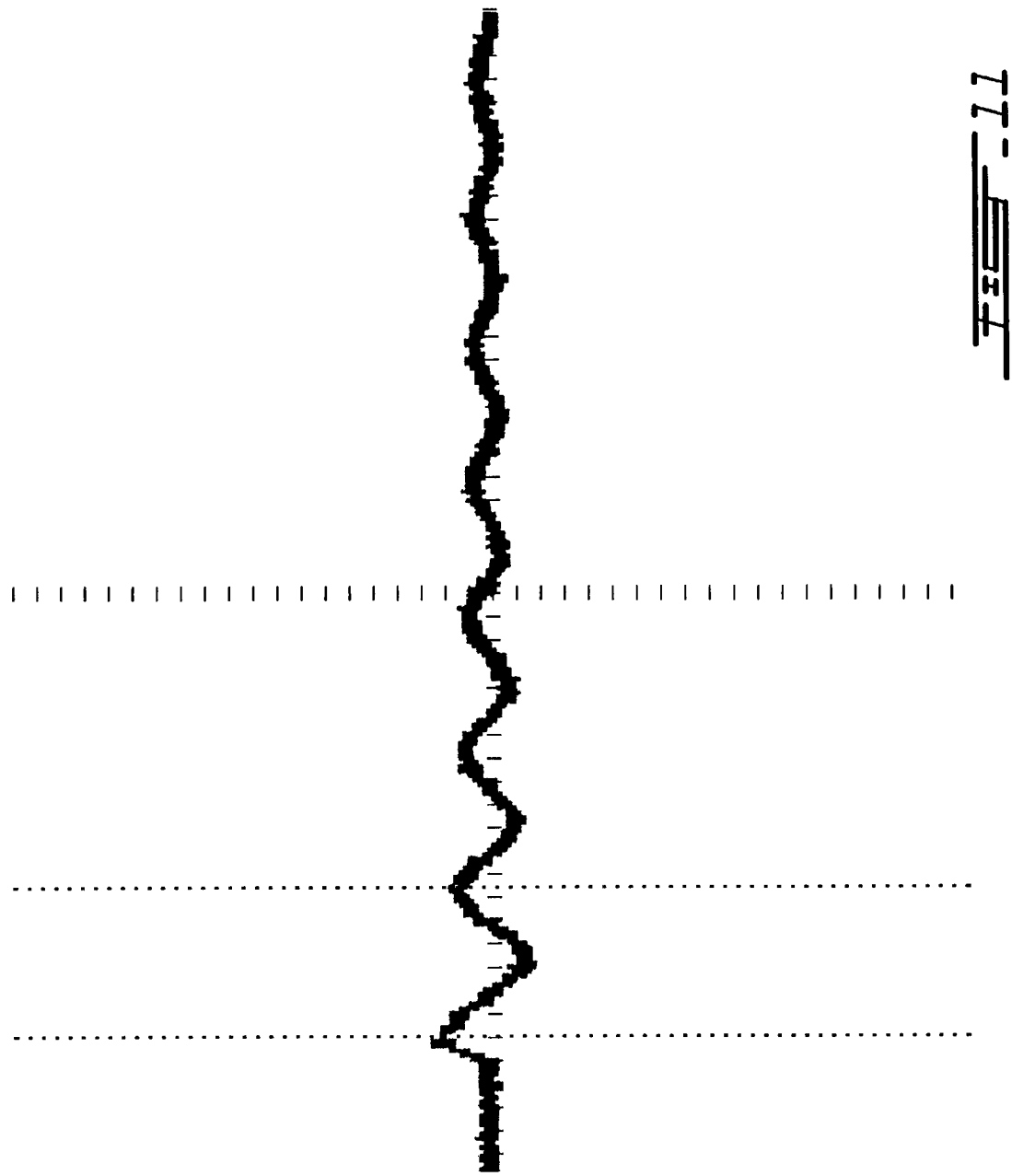
FIG. 11 illustrates the impulse of the phase controller after mitigation.
Figure 17:
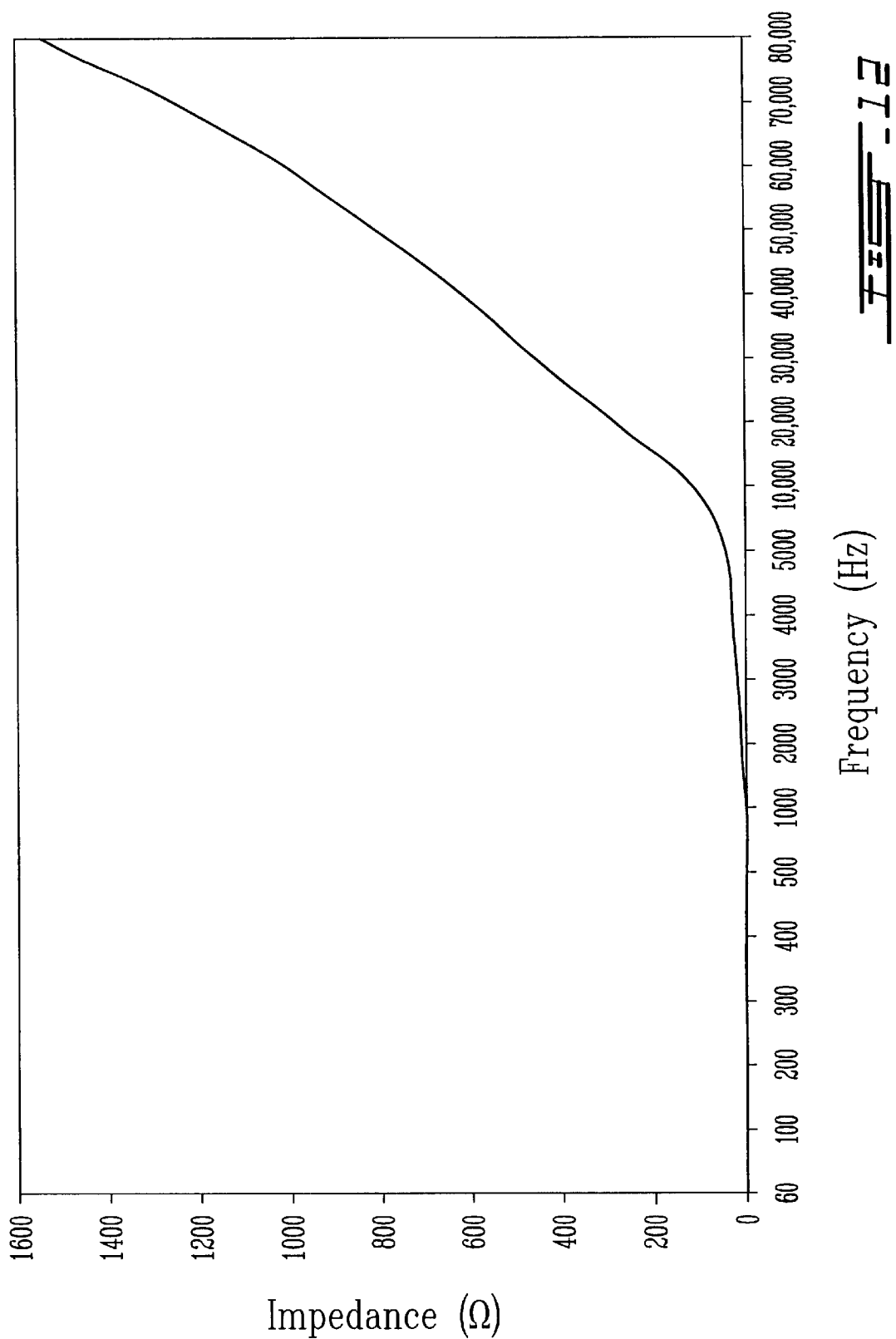

FIG. 11 shows the impulse of a phase controller after mitigation. The insertion of a mitigation to attenuate the impulse currents has for object to decrease the value of the frequency and distribute the energy on many periods. The energy cannot be eliminated, it can only be distributed on a greater number of periods. This diminishes the peak value of the first impulse.

The object is to decrease the time period such that the signal is maintained at a frequency lower than 15 kHz. The value IZ2 is decreased and the resistance of the animal is maintained at a level of about 145 ohms.

FIG. 12 shows the frequency response for a Variable Speed Drive at 45 A, 3Q. The impedance imposed in the control loop varies as a function of the frequency for the SVF filter. The filter is a 4 ferrite, 10 turns on 75 Ω. The values obtained are as follows:

TABLE 12

Frequency response data for a Variable Speed Drive at 45 A, 3Q

| Frequency | Line voltage | Residual Voltage | Residual Current | Impedance |
| --- | --- | --- | --- | --- |
| 60 | 2.004 | 1.995 | 0.0266 | 0.33834586 |
| 100 | 2.005 | 1.995 | 0.0266 | 0.37593985 |
| 200 | 2.005 | 1.993 | 0.02657333 | 0.45158053 |
| 300 | 2.007 | 1.991 | 0.02654667 | 0.6027122 |
| 400 | 2.009 | 1.99 | 0.02653333 | 0.7160804 |
| 500 | 2.012 | 1.987 | 0.02649333 | 0.94363362 |
| 1000 | 2.006 | 1.937 | 0.02582667 | 2.6716572 |
| 2000 | 2.012 | 1.799 | 0.02398667 | 8.8799333 |
| 3000 | 2.002 | 1.621 | 0.02161333 | 17.6280074 |
| 4000 | 2.014 | 1.456 | 0.01941333 | 28.7431319 |
| 5000 | 2.012 | 1.295 | 0.01726667 | 41.5250965 |
| 10,000 | 2.011 | 0.792 | 0.01056 | 115.435606 |
| 20,000 | 2.011 | 0.422 | 0.00562667 | 282.405213 |
| 30,000 | 2.01 | 0.286 | 0.00381333 | 452.097902 |
| 40,000 | 2.007 | 0.219 | 0.00292 | 612.328767 |
| 50,000 | 2.01 | 0.171 | 0.00228 | 806.578947 |
| 60,000 | 2.014 | 0.14 | 0.00186667 | 1003.92857 |
| 70,000 | 2.02 | 0.115 | 0.00153333 | 1242.3913 |
| 80,000 | 2.003 | 0.093 | 0.00124 | 1540.32258 |

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A stray current attenuation device for attenuating a stray current impulse flowing through a ground return circuit in a proximity of an animal susceptible to be affected by said stray current impulse, comprising:

an impedance having one coil for each power line at an input of an electrically conductive element, wherein all said coils are magnetically coupled via a common ferrite core, wherein said coils have a same number of windings and wherein a summation of ampere turns of said coils is equal to zero;

said impedance being in series between the output of a power source and said electrically conductive element, said electrically conductive element being connected to said ground return circuit;

whereby attenuation of the stray current impulse limits capacitive leakage which affects the animal and whereby an inductance of the impedance, coupled to a parasitic capacitance of the electrically conductive element, creates a reactive filter effect.

2. A device as claimed in claim 1, further comprising a drive circuit for controlling said electrically conductive element, said drive circuit being in series on one of said power lines.

3. A device as claimed in claim 2, wherein said impedance is between said drive circuit and said electrically conductive element.

4. A device as claimed in claim 2, wherein said impedance is between said power source and said drive circuit.

5. A device as claimed in claim 1, wherein said impedance has two coils, one coil for each power line.

6. A device as claimed in claim 5, wherein said electrically conductive element is a motor and wherein said motor is connected to two power lines and said ground return circuit, said ground return circuit being connected to a neutral line of said power source.

7. A device as claimed in claim 1, wherein said impedance has three coils, one coil for each line at the input of said electrically conductive element, said lines being a power line, a neutral line and a ground return circuit line, and wherein said electrically conductive element is an electrical fence connected to said power line, said neutral line and said ground return circuit line.

8. A device as claimed in claim 1, wherein said impedance has one coil and said electrically conductive element is a farm.

9. A device as claimed in claim 1, wherein said electrically conductive element is a power inverter for a motor and said motor, said power inverter being connected to said motor and said motor being connected to said ground return circuit and wherein said impedance is located in series between said power source and said power inverter.

10. A device as claimed in claim 9, wherein said power inverter is connected to two power lines and said impedance has two coils.

11. A device as claimed in claim 9, wherein said motor is a second electrically conductive element and wherein a second impedance is located in series between said power inverter and said motor.

12. A device as claimed in claim 11, wherein said motor is connected to three output lines of said power inverter and wherein said second impedance has three coils.

13. A method for attenuating a stray current impulse flowing through a ground return circuit in a proximity of an animal susceptible to be affected by said stray current impulse, comprising:

providing an impedance having one coil for each power line at an input of an electrically conductive element, wherein all said coils are magnetically coupled via a common ferrite core, wherein said coils have a same number of windings and wherein a summation of ampere turns of said coils is equal to zero;

connecting said impedance in series between the output of a power source and said electrically conductive element, said electrically conductive element being connected to said ground return circuit;

whereby attenuation of the stray current impulse limits capacitive leakage which affects the animal and whereby an inductance of the impedance, coupled to a parasitic capacitance of the electrically conductive element, creates a reactive filter effect.

* * * * *